United States Patent [19]

Matsumoto et al.

[11] Patent Number: 5,952,934

[45] Date of Patent: Sep. 14, 1999

[54] TERMINAL ID AUTOMATIC ASSIGNING SYSTEM

[75] Inventors: Masaharu Matsumoto; Eriko Gokita, both of Tokyo, Japan

[73] Assignee: Fujitsu Limited, Kanagawa, Japan

[21] Appl. No.: 08/824,901

[22] Filed: Mar. 26, 1997

[30]   Foreign Application Priority Data

Jul. 24, 1996  [JP]  Japan .................................. 8-195054

[51] Int. Cl.$^6$ ...................................................... H04Q 5/22
[52] U.S. Cl. .............................. 340/825.52; 340/825.05; 395/186; 395/187
[58] Field of Search ........................ 340/825.52, 825.05; 395/186, 187.01, 200.14, 188.01

[56]   References Cited

U.S. PATENT DOCUMENTS

| 5,250,942 | 10/1993 | Nakayama | 340/825.52 |
| 5,745,571 | 4/1998 | Zuk | 380/21 |

FOREIGN PATENT DOCUMENTS

| 63-292833 | 11/1988 | Japan . |
| 5-122295 | 5/1993 | Japan . |
| 6-177934 | 6/1994 | Japan . |

*Primary Examiner*—Michael Horabik
*Assistant Examiner*—Anthony A Asongwed
*Attorney, Agent, or Firm*—Helfgott & Karas, P.C.

[57]   ABSTRACT

A center unit sends a terminal ID assignment request message for requesting an assignment of a terminal ID through a predetermined control channel in a network. When a terminal unit that has not been assigned a terminal ID receives the terminal ID assignment request message through the predetermined control channel in the network, the terminal unit sends a terminal ID assignment request acknowledgment message that is an acknowledgment of the received terminal ID assignment request message through the predetermined control channel in the network. After a center unit has received the terminal ID assignment request acknowledgment message through the predetermined control channel in the network, the center unit exchanges messages with the terminal unit that has received the terminal ID assignment request acknowledgment message. Thus, a terminal ID can be assigned to the terminal unit.

20 Claims, 24 Drawing Sheets

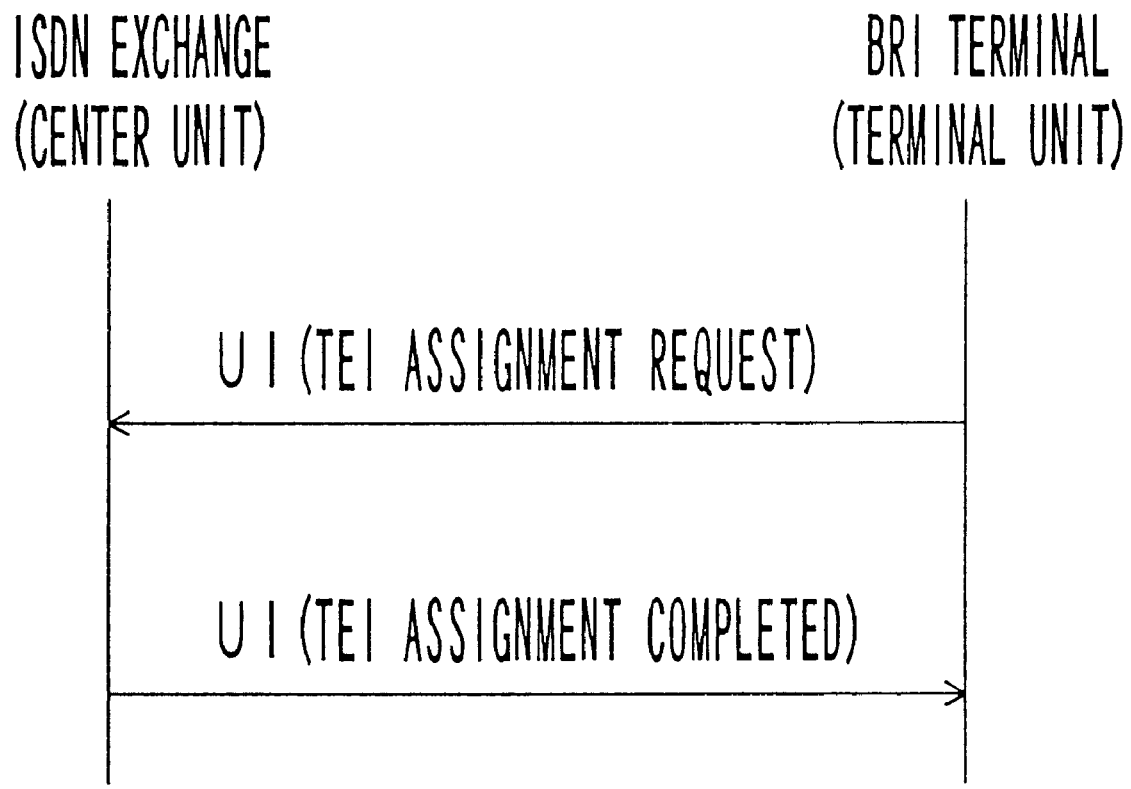
F I G. 1

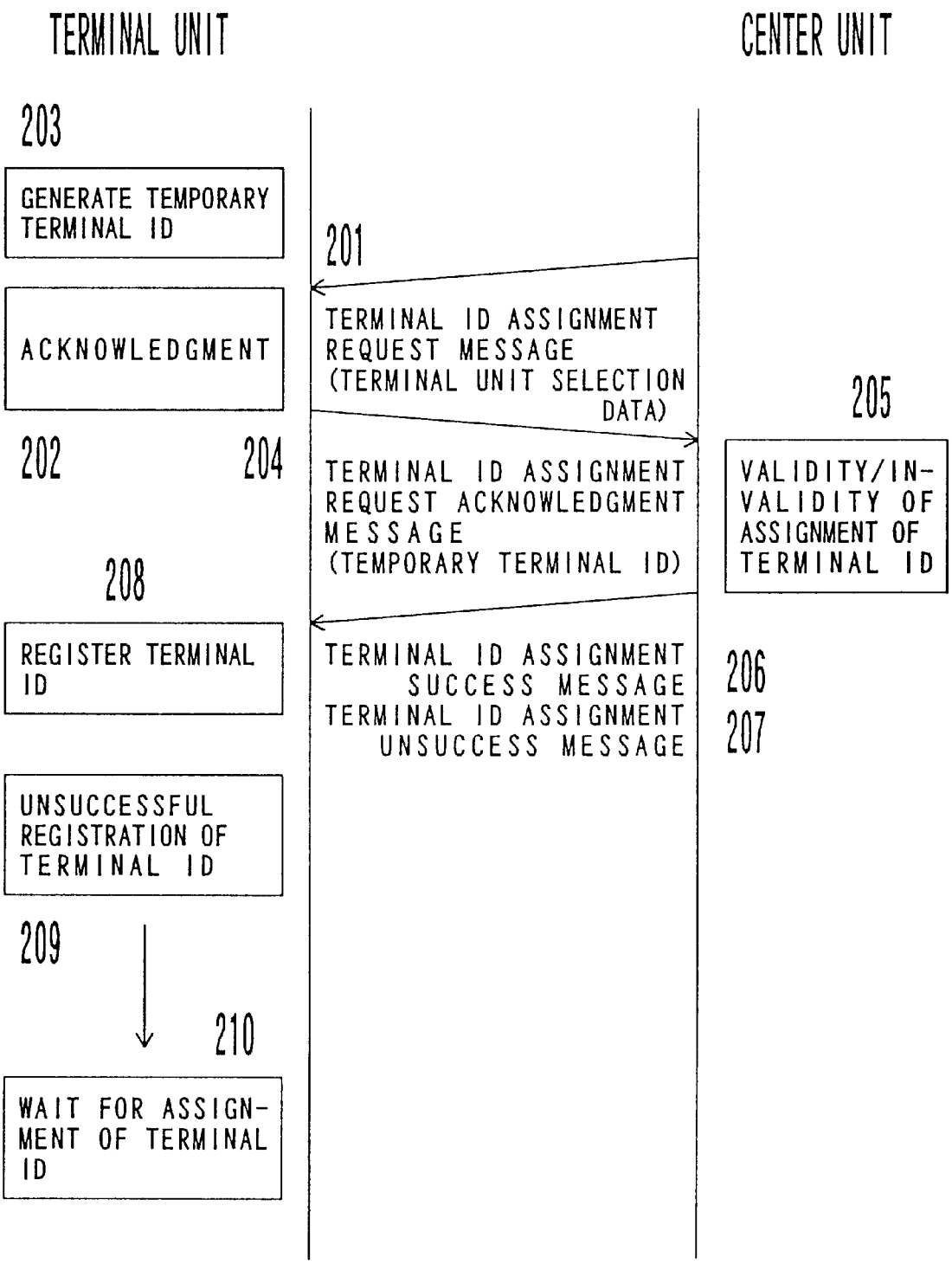
F I G. 2

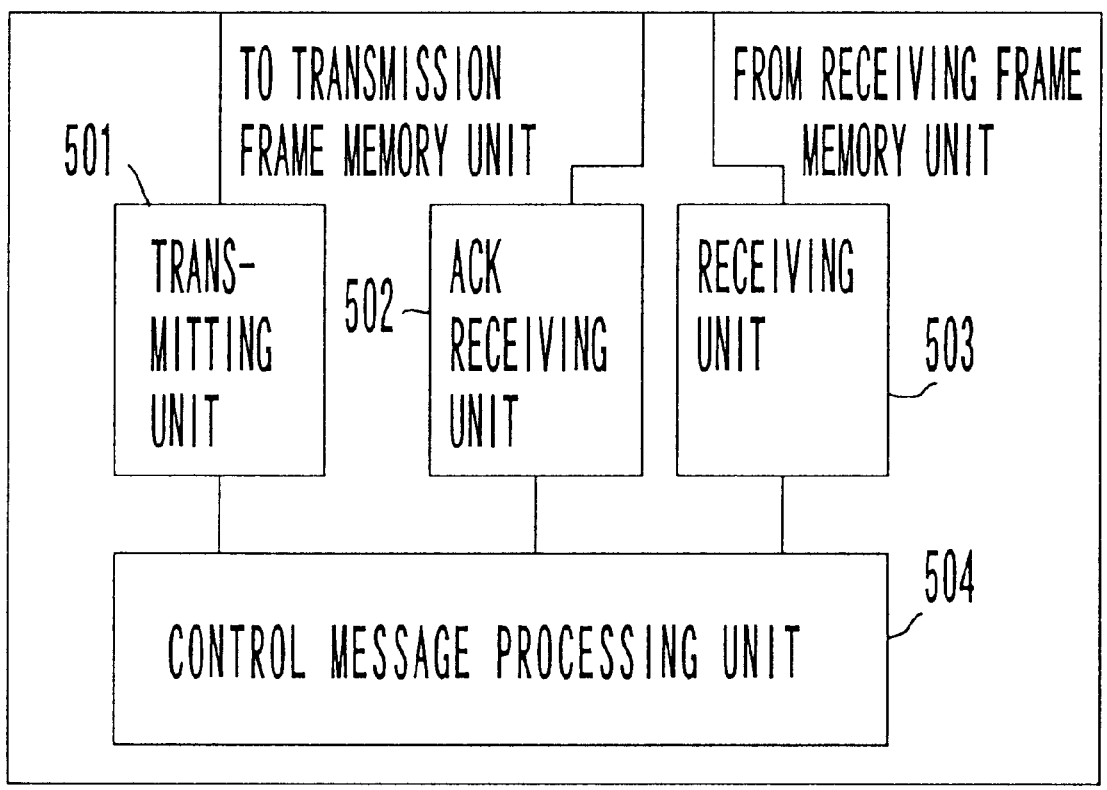
F I G. 5

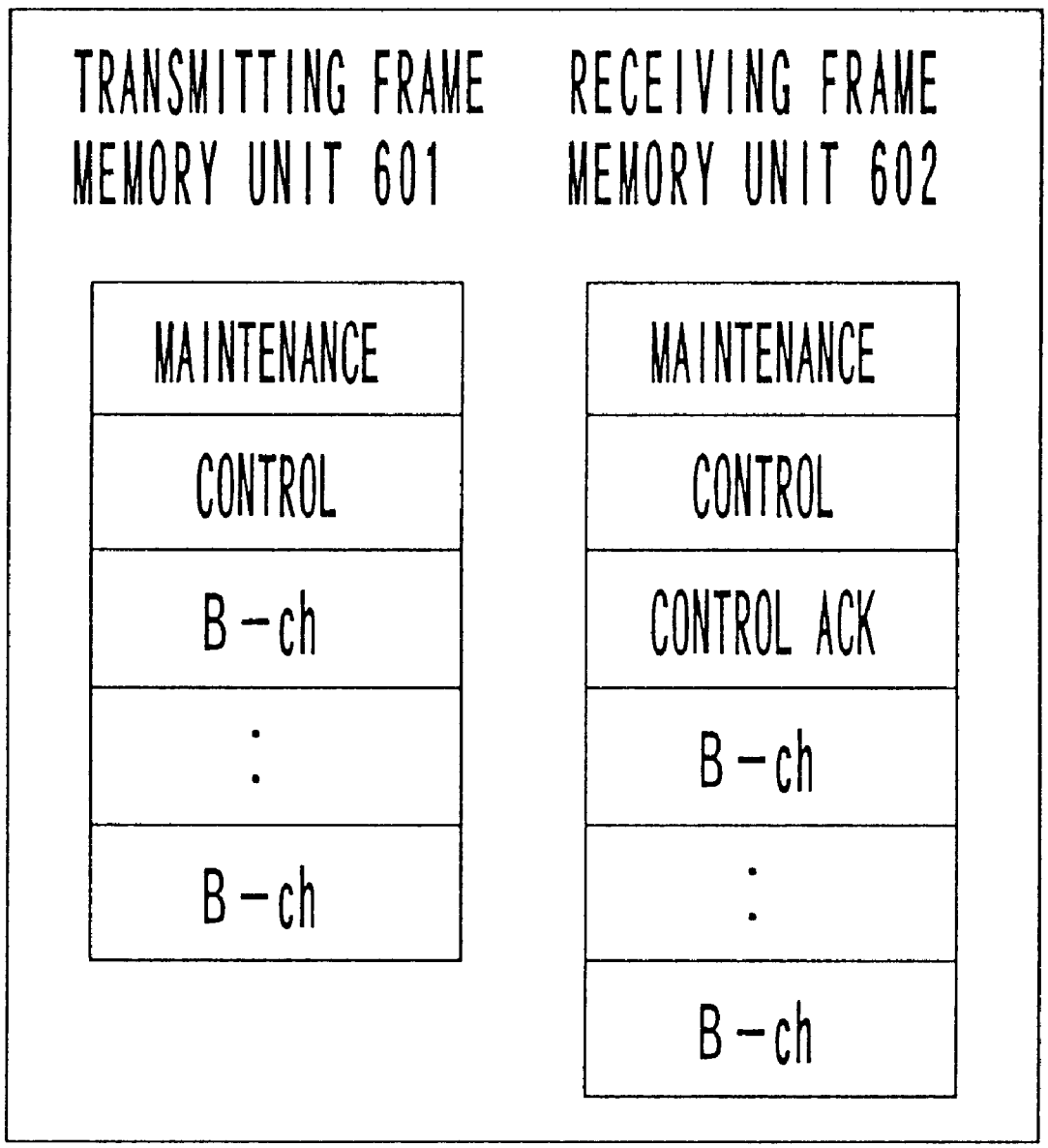
F I G. 6

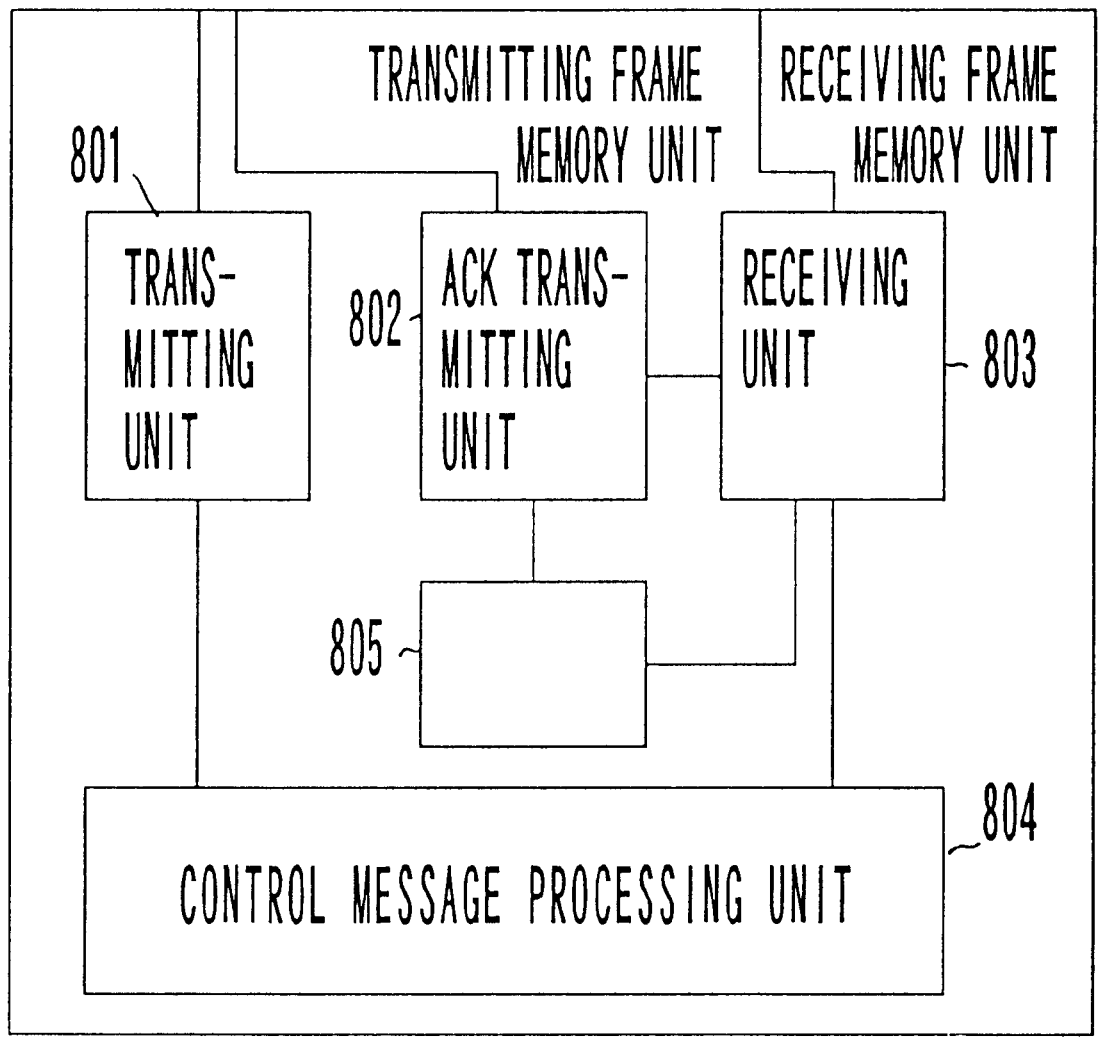
F I G. 8

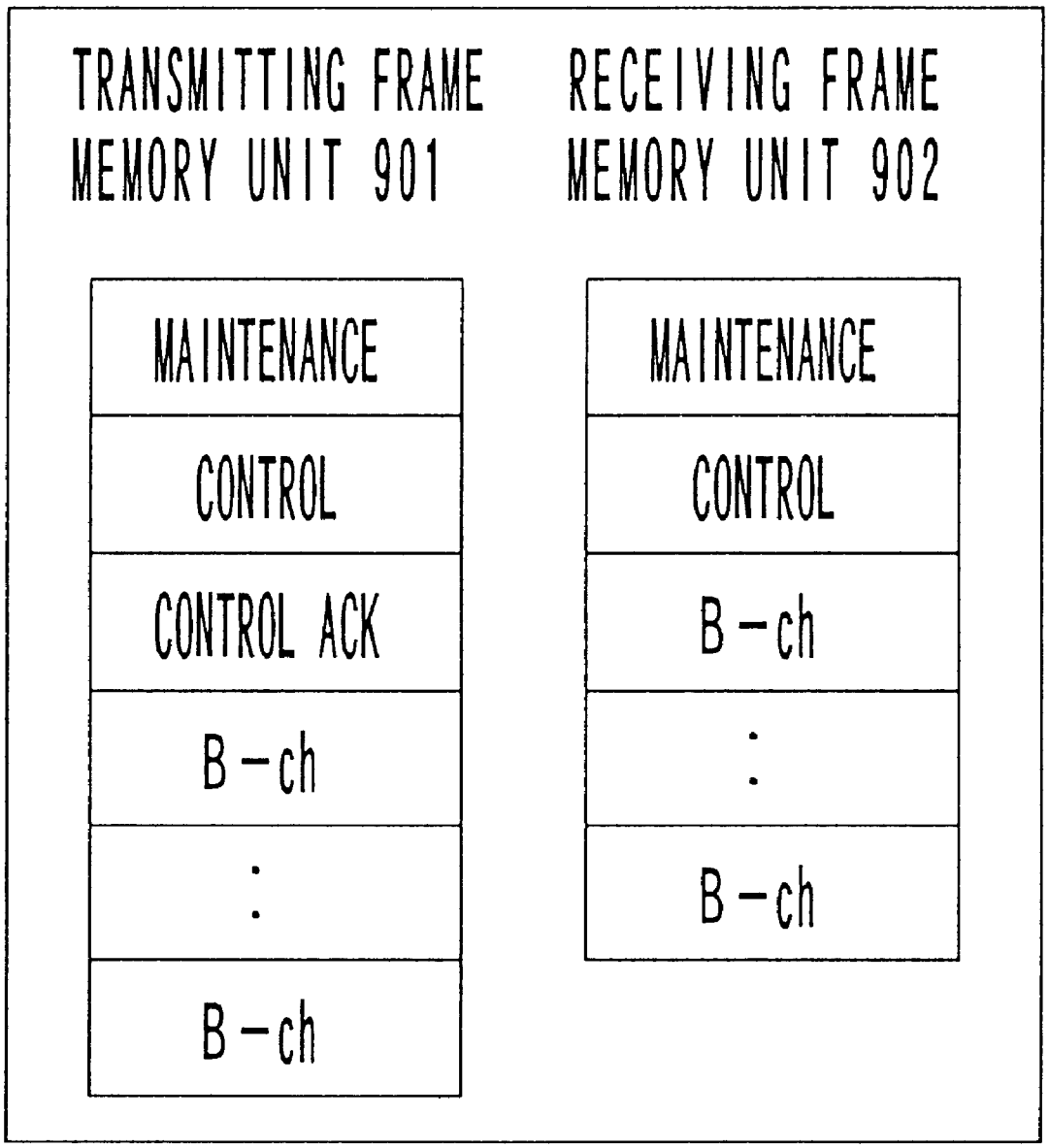
F I G. 9

| TRANS-MISSION SYSTEM | TRANSMISSION MEDIUM | COAXIAL CABLE (HFC) | |
|---|---|---|---|
| | TRANSMISSION RATE | 8.192Mbps | |
| | TRANSMISSION RF CHANNEL | UP | 10MHz TO 50MHz, ONE OF FIVE CHANNELS |
| | | DOWN | 222MHz TO 550MHz, ONE OF 54 CHANNELS |
| | ACCESS SYSTEM | UP | TDMA (MULTI ACCESS TRANSMISSION WITH SLOT ALOHA) |
| | | DOWN | TDM |
| MODULATION SYSTEM | QPSK (4.096Mbaud) | | |
| FRAME STRUCTURE | FRAME STRUCTURE | UP | 4096bytes/4ms |
| | | DOWN | STRUCTURE OF (128bytes/125μs)×32 MULTIFRAMES |
| | CHANNEL STRUCTURE | UP | B CHANNEL ×95 (SOUND/DATA: 64Kbps) |
| | | | C CHANNEL ×1 (INTERACTIVE CONTROL:128Kbps) |
| | | | D CHANNEL ×1 (CALL CONTROL: 64Kbps) |
| | | | M CHANNEL ×1 (MAINTENANCE/DISTANCE MEASUREMENT: 16Kbps) |
| | | | ACK-C CHANNEL ×1 ( C CHANNEL DATA FRAME ACKNOWLEDGMENT: 10Kbps) |
| | | | ACK-D CHANNEL ×1 ( D CHANNEL DATA FRAME ACKNOWLEDGMENT: 10Kbps) |
| | | DOWN | B CHANNEL ×95 (SOUND/DATA: 64Kbps) |
| | | | C CHANNEL ×1 (INTERACTIVE COTROL: 240Kbps) |
| | | | D CHANNEL ×1 (CALL CONTROL: 120Kbps) |
| | | | M CHANNEL ×1 (MAINTENANCE/DISTANCE MEASUREMENT : 16Kbps) |

F I G. 1 0

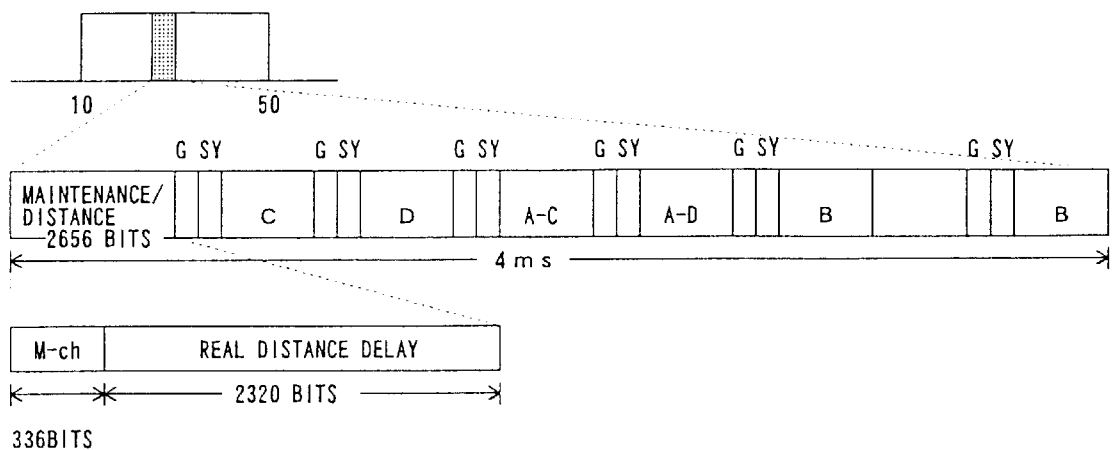

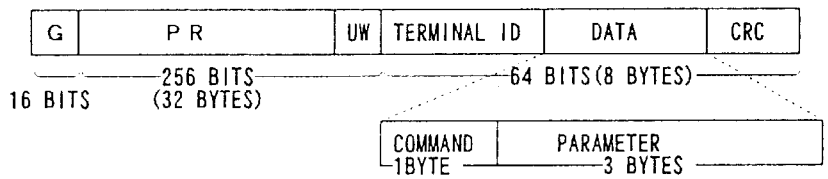

(1) M CHANNEL (ID ASSIGNMENT, DISTANCE MEASUREMENT CHANNEL)

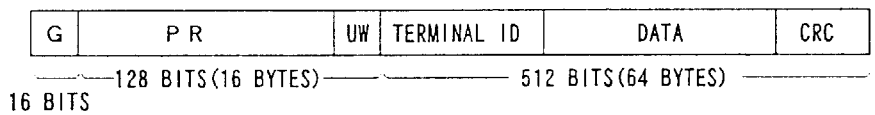

(2) C CHANNEL (INTERACTIVE CONTROL CHANNEL)

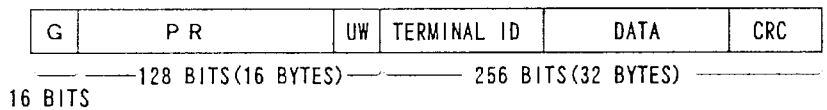

(3) D CHANNEL (CALL CONTROL CHANNEL)

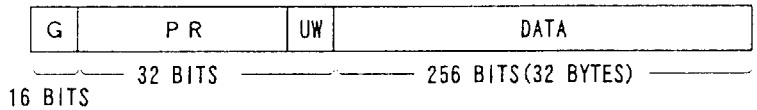

(4) B CHANNEL (SOUND/DATA CHANNEL)

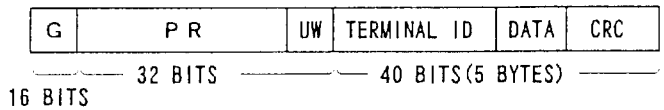

(5) ACK-C CHANNEL (C CHANNEL DEDICATED ACK)

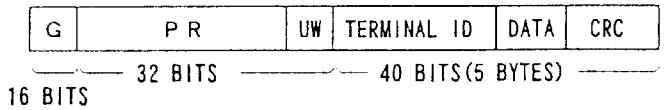

(6) ACK-D CHANNEL (D CHANNEL DEDICATED ACK)

```
   | G |    P R    | UW | TERMINAL ID | DATA | CRC |
   ───── 32 BITS ──────── 40 BITS(5 BYTES) ─────
16 BITS
```

G : GUARD TIMING
PR : SYNCHRONOUS BIT ( PREAMBLE: ALL '1' )
UW : UNIQUE READ (11100011)
SY : SYNCHRONOUS SIGNAL GENERAL NAME (PR + UW)

FIG. 11

FRAME LENGTH 125μm, MULTI-FRAME LENGTH 4ms
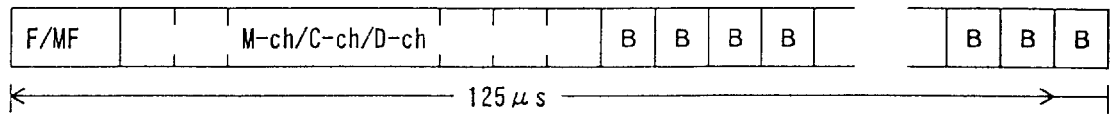
|←———————————— 125μs ————————————→|
(1) F, MF (FRAME, MULTIFRAME SYNCHRONOUS SIGNAL)
| FRAME/MULTI-FRAME SYNCHRONOUS BIT= 16 BITS |
(2) M CHANNEL
| TERMINAL ID | COMMAND | PARAMETER | CRC |
| 2 BYTES | 1 BYTE | 3 BYTES | 2 BYTES |
——————————— 64 BITS (8 BYTES) ———————————
(3) C CHANNEL
| TERMINAL ID | DATA | CRC |
——————————— 960 BITS (120 BYTES) ———————————
(4) D CHANNEL (CALL CONTROL CHANNEL)
| TERMINAL ID | DATA | CRC |
——————————— 480 BITS (60 BYTES) ———————————
(5) B CHANNEL (SOUND/DATA CHANNEL)
| DATA |
——— 8 BITS (1 BYTE) ———
F I G. 1 2

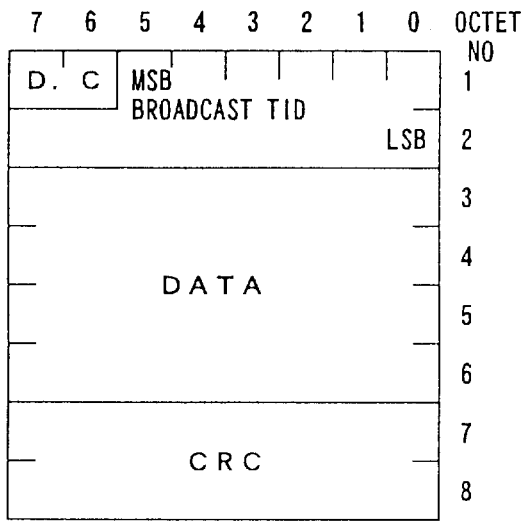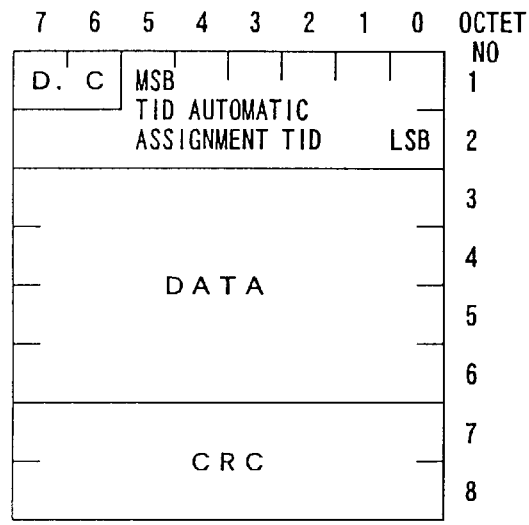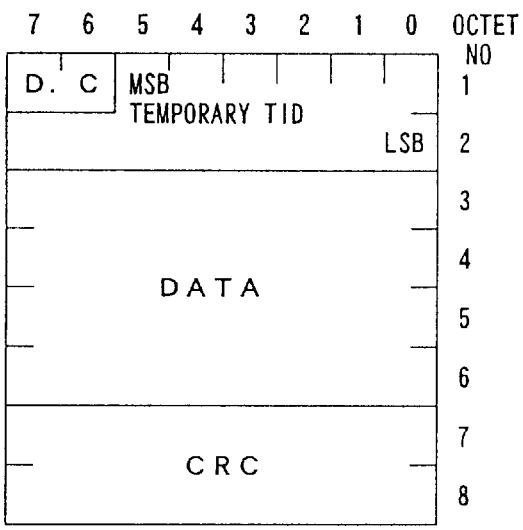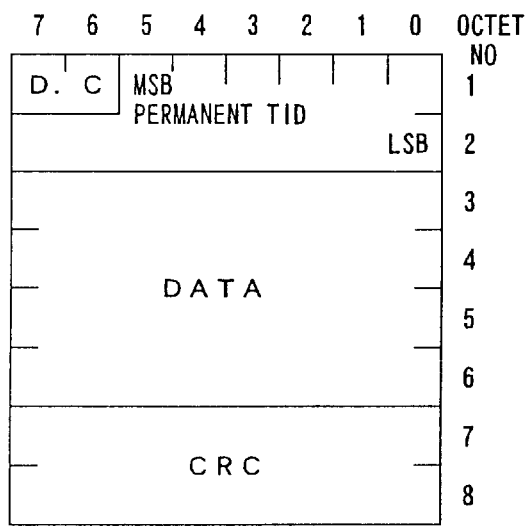
FIG. 13

| | CONTENTS OF HEADER | COMMAND TYPE | CATEGORY |
|---|---|---|---|
| (a) | BROADCAST TID (3FFF) | TDMA INFORMATION NOTIFICATION | TDMA INFORMATION NOTIFICATION |
| (b) | TID ASSIGNMENT TID (3FFE) | TID ASSIGNMENT REQUEST | TID ASSIGNMENT |
| | | TID ASSIGNMENT UNSUCCESS | |
| (c) | TEMPORARY TID (2000 ~3FEF) | TID ASSIGNMENT ACK | TID ASSIGNMENT |
| | | TID ASSIGNMENT SUCCESS | |
| | | TID ASSIGNMENT SUCCESS ACK | |
| (d) | PERMANENT TID (0001 ~1FFF) | DISTANCE INFORMATION NOTIFICATION | DISTANCE INFORMATION NOTIFICATION |
| | | DISTANCE INFORMATION ACK | |
| | | Dch RETRANSMISSION NUMBER-OF-TIMES DESIGNATION REQUEST | MAINTENANCE INFORMATION NOTIFICATION |
| | | Dch RETRANSMISSION NUMBER-OF-TIMES DESIGNATION ACK | |
| | | Cch RETRANSMISSION NUMBER-OF-TIMES DESIGNATION REQUEST | |
| | | Cch RETRANSMISSION NUMBER-OF-TIMES DESIGNATION ACK | |
| | | Dch-CRC ERROR OCCURRENCE NUMBER-OF-TIMES DESIGNATION REQUEST | |
| | | Dch-CRC ERROR OCCURRENCE NUMBER-OF-TIMES DESIGNATION ACK | |
| | | Cch-CRC ERROR OCCURRENCE NUMBER-OF-TIMES DESIGNATION REQUEST | |
| | | Cch-CRC ERROR OCCURRENCE NUMBER-OF-TIMES DESIGNATION ACK | |
| | | Bch LOOP BACK DESIGNATION REQUEST | |
| | | Bch LOOP BACK DESIGNATION ACK | |
| | | Bch LOOP BACK CANCELLATION REQUEST | |
| | | Bch LOOP BACK CANCELLATION ACK | |
| | | COUNTER RESET REQUEST | |
| | | COUNTER RESET ACK | |
| | | CH ASSIGNMENT REQUEST | FIXED CH ASSIGNMENT |
| | | CH ASSIGNMENT ACK | |
| | | RESET REQUEST | TSTB RESET |
| | | RESET ACK | |

FIG. 14

(a) TDMA INFORMATION NOTIFICATION

```
7 6 5 4 3 2 1 0   OCTET NO.                                    7 6 5 4 3 2 1 0
┌─────────────────┐ 1   TDMA INFORMATION                        ┌───────┬───────┐
│TDMA INFORMATION NOTIFICATION│        NOTIFICATION : 01(Hex)    │   0   │   1   │
├────────┬────────┤ 2   TDMA-ID       : 0~F(Hex)                ├───────┼───────┤
│TDMA-ID │ UP RFch│     UP RFch       : 1~7(Hex)                │x x x x│0 x x x│
├────────┴────────┤ 3   NOT USED      : 2 OCTETS                │   0   │   0   │
│     NOT USED    │ 4                    (=0)                   │   0   │   0   │
└─────────────────┘                                             └───────┴───────┘
```

(b) TID ASSIGNMENT REQUEST

```
7 6 5 4 3 2 1 0   OCTET NO.                                    7 6 5 4 3 2 1 0
┌─────────────────┐ 1  TID ASSIGNMENT REQUEST :                 ┌───────────────┐
│TID ASSIGNMENT REQUEST│                  11(Hex)                │     1     1   │
├────────┬────────┤ 2  NOT USED (1) :                           ├───────┬───────┤
│NOT USED(1)│LOW ORDER 1DIGIT│  HIGH ORDER 4 BITS(=0)           │0 0 0 0│x x x x│
│        │OF TEMPORARY ID │ 3 LOW ORDER 1 DIGIT OF              ├───────┼───────┤
│NOT USED(2)│             │     TEMPORARY TID : 0 ~F(Hex)       │0 0 0  │x x x x│
│        │PERMANENT TID   │ 4 NOT USED (2) :                    ├───────┴───────┤
│        │                │     HIGH ORDER 3 BITS(=0)           │x x x x x x x x│
└────────┴────────┘       PERMANENT TID : 0001 ~1FFF(Hex)       └───────────────┘
```

(c) TID ASSIGNMENT REQUEST ACK

```
7 6 5 4 3 2 1 0   OCTET NO.                                    7 6 5 4 3 2 1 0
┌─────────────────┐ 1  TID ASSIGNMENT REQUEST ACK :             ┌───────────────┐
│TID ASSIGNMENT REQUEST ACK│                  11(Hex)           │     1     1   │
├────────┬────────┤ 2  NOT USED (1) :                           ├───────┬───────┤
│NOT USED│        │    HIGH ORDER 3 BITS(=0)                    │0 0 0  │x x x x│
│        │PERMANENT TID│ 3 PERMANENT TID:                       ├───────┴───────┤
│        │        │         0001~1FFF(Hex)                      │x x x x x x x x│
├────────┴────────┤ 4 NOT USED (2) : 1 OCTET(=0)                ├───────────────┤
│    NOT USED (2) │                                             │      0  0     │
└─────────────────┘                                             └───────────────┘
```

FIG. 15

(d) TID ASSIGNMENT SUCCESS

| 7 | 6 | 5 | 4 | 3 | 2 | 1 | 0 | OCTET NO. | | 7 | 6 | 5 | 4 | 3 | 2 | 1 | 0 |
|---|---|---|---|---|---|---|---|---|---|---|---|---|---|---|---|---|---|
| TID ASSIGNMENT SUCCESS ||||||||1 | TID ASSIGNMENT SUCCESS : 12(Hex) | | | | 1 | | 2 | | |
| *1 DISTANCE MEASUREMENT RESULT ||||||||2 | DISTANCE MEASUREMENT RESULT: 0000~FFFF(Hex) | x|x|x|x|x|x|x|x |
| |||||||| 3 | (-32768 ~ +32767(Dec)) | x|x|x|x|x|x|x|x |
| NOT USED |||| *2 CARRIER LEVEL ||||4 | NOT USED : HIGH ORDER 4 BITS (=0) CARRIER LEVEL : 0 ~F(Hex) (-8 ~+7(Dec)) | 0|0|0|0|x|x|x|x |

*1), *2) NEGATIVE NUMBER IS REPRESENTED BY COMPLIMENT OF 1

(e) TID ASSIGNMENT SUCCESS ACK

| 7 | 6 | 5 | 4 | 3 | 2 | 1 | 0 | OCTET NO. | | 7 | 6 | 5 | 4 | 3 | 2 | 1 | 0 |
|---|---|---|---|---|---|---|---|---|---|---|---|---|---|---|---|---|---|
| TID ASSIGNMENT SUCCESS ACK ||||||||1 | TID ASSIGNMENT SUCCESS ACK : 12(Hex) | | | | 1 | | 2 | | |
| NOT USED(1) |||PERMANENT TID |||||2 | NOT USED (1) : HIGH ORDER 3 BITS (=0) | 0|0|0|x|x|x|x|x |
| ||||||||3 | PERMANENT TID : 0001~1FFF(Hex) | x|x|x|x|x|x|x|x |
| NOT USED(2) ||||||||4 | NOT USED (2) : 1 OCTET (=0) | | | | | | 0|0| |

(f) TID ASSIGNMENT UNSUCCESS

| 7 | 6 | 5 | 4 | 3 | 2 | 1 | 0 | OCTET NO. | | 7 | 6 | 5 | 4 | 3 | 2 | 1 | 0 |
|---|---|---|---|---|---|---|---|---|---|---|---|---|---|---|---|---|---|
| TID ASSIGNMENT UNSUCCESS ||||||||1 | TID ASSIGNMENT UNSUCCESS : 13(Hex) | | | | 1 | | 3 | | |
| NOT USED(1) ||||LOW ORDER 1 DIGIT OF TEMPORARY TID ||||2 | NOT USED (1) : HIGH ORDER 4 BITS(=0) | 0|0|0|0|x|x|x|x |
| ||||||||3 | LOW ORDER 1 DIGIT OF TEMPORARY TID : 0 ~F(Hex) | | | | | 0|0| | |
| NOT USED (2) ||||||||4 | NOT USED (2) : 2 OCTETS(=0) | | | | | | 0|0| |

FIG. 16

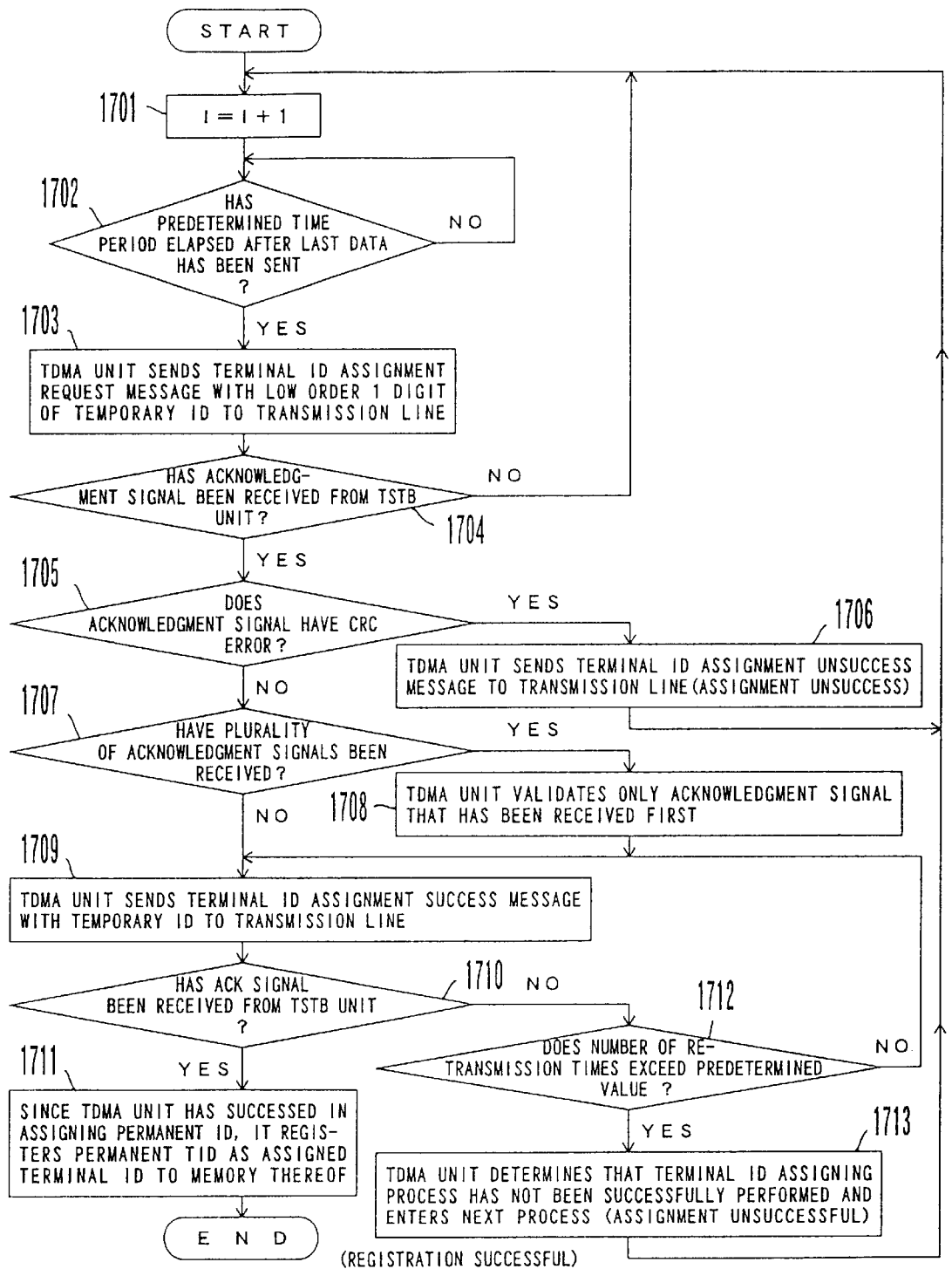
F I G. 1 7

TERMINAL ID AUTOMATIC ASSIGNING SYSTEM

BACKGROUND OF THE INVENTION

1. Field of the Invention

The present invention relates to a technology for automatically assigning terminal IDs that are identifiers for uniquely identifying each of a plurality of terminal units on a network having a "1" to "n" connecting function, such as a CATV network, in the system a center unit and the terminal unit being able to bidirectionally communicate.

2. Description of the Related Art

In recent years, a network communication system that accomplishes a bidirectional service such as a telephone service or a VOD (Video On Demand) service, has been developed using an existing CATV network that performs "1" to "n" connections. In such a communication system, since a plurality of terminal units are connected to one center unit, each terminal unit should be uniquely assigned respective identifier (terminal ID).

In a conventional bidirectional communication system such as the PHS (Personal Handyphone System), terminal IDs of terminal units are normally assigned when they are shipped from their factories.

However, in this system, since terminal IDs should be assigned uniquely throughout the world, their ID numbers become long. In addition, the ID number writing process and management of the terminal IDs become complicated.

In a conventional system for automatically assigning terminal IDs, the TEI (Terminal Endpoint Identifier) assigning system is known. In the TEI system, an ISDN (Integrated Services Digital Network) exchange that is a center unit assigns IDs to BRI (Basic Rate Interface) terminal units. In this system, as shown in FIG. 1, a BRI terminal unit sends a UI (Unacknowledged Information) message that represents a TEI assignment request to the ISDN exchange. The ISDN exchange assigns an TEI to the BRI terminal unit, stores the assigned TEI, and sends a UI message that acknowledges that the TEI has been assigned to the BRI terminal unit. When the BRI terminal unit receives the acknowledgment message, the BRI terminal registers the TEI of the message. Thereafter, the BRI terminal unit communicates with the center unit using the assigned TEI. In this manner, TEIs can be automatically assigned to individual BRI terminal units.

The TEI assigning system has been defined with respect to a basic rate interface of the ISDN having two B channels and one D channel. The system deals with up to eight BRI terminal units that can be connected to one "2B+D" interface. Thus, in the above-described system in which a terminal unit sends a terminal ID assignment request to the center unit, when the number of terminal units increases, the probability of which assignment requests contend rises. However, the above-described system does not provide a mechanism for solving such contention. Thus, the above-described system cannot be applied for a bidirectional communication system that assigns unique terminal IDs to many terminals.

SUMMARY OF THE INVENTION

The present invention is made from the above-described point of view. An object of the present invention is to automatically and effectively assign terminals IDs for uniquely identifying terminal units in a network.

According to the present invention, a center unit sends a terminal ID assignment request message for requesting an assignment of a terminal ID through a predetermined control channel in the network.

When the power of a terminal unit that has not been assigned a terminal ID is turned on, the terminal unit randomly generates a temporary terminal ID for temporarily identifying the terminal ID before the center unit assigns a permanent ID to the terminal unit.

When a terminal unit that has not been assigned a terminal ID receives the terminal ID assignment request message through the predetermined control channel in the network, it sends a terminal ID assignment request acknowledgment message that is an acknowledgment of the received terminal ID assignment request message and that includes the temporary terminal ID generated by the terminal unit to the center unit through the predetermined control channel in the network.

After the center unit has received the terminal ID assignment acknowledgment message from the terminal unit through the predetermined control channel in the network, the center unit identifies that a temporary terminal ID is added to the terminal ID assignment request message, exchanges messages with the terminal unit sending the temporary terminal ID, and assigns a permanent terminal ID to the terminal unit based on the temporary terminal ID.

According to an example of the structure of the present invention, the center unit identifies that a temporary terminal ID has been randomly generated by the terminal unit, and exchanges messages with the terminal unit so as to automatically assign a permanent terminal ID to the terminal unit. Thus, when terminal IDs are assigned to a plurality of terminal units, the terminal IDs can be properly prevented from contending.

BRIEF DESCRIPTION OF DRAWINGS

These and other objects, features and advantages of the present invention will become more apparent in light of the following detailed description of a best mode embodiment thereof, as illustrated in the accompanying drawings.

FIG. 1 is a schematic diagram showing a sequence of a TEI assigning system for a BRI terminal in the prior art;

FIG. 2 is a sequence chart showing the theory of a preferred embodiment of the present invention;

FIG. 5 is a block diagram showing a CPU of a system controlling unit of the TDMA unit;

FIG. 6 is a block diagram showing a RAM of the system controlling unit of the TDMA unit;

FIG. 8 is a block diagram showing a CPU of the TSTB unit;

FIG. 9 is a block diagram showing a memory of the TSTB unit;

FIG. 10 is a table showing the structure of an interface of a transmission line according to the preferred embodiment;

FIG. 11 is a schematic diagram showing the frame structure of an up transmission line;

FIG. 12 is a schematic diagram showing the frame structure of a down transmission line;

FIG. 13 is a schematic diagram showing an example of the frame format of a control message with respect to a terminal ID automatic assigning process;

FIG. 14 is a table showing commands of control messages with respect to the terminal ID automatic assigning process;

FIG. 15 is a schematic diagram showing command parameters of control messages with respect to the terminal ID automatic assigning process (No. 1);

FIG. 16 is a schematic diagram showing command parameters of control messages with respect to the terminal ID automatic assigning process (No. 2);

FIG. 17 is a flowchart showing an operation of the TDMA unit with respect to the terminal ID automatic assigning process;

DESCRIPTION OF PREFERRED EMBODIMENTS

<Theoretical Description>

Figure 3:
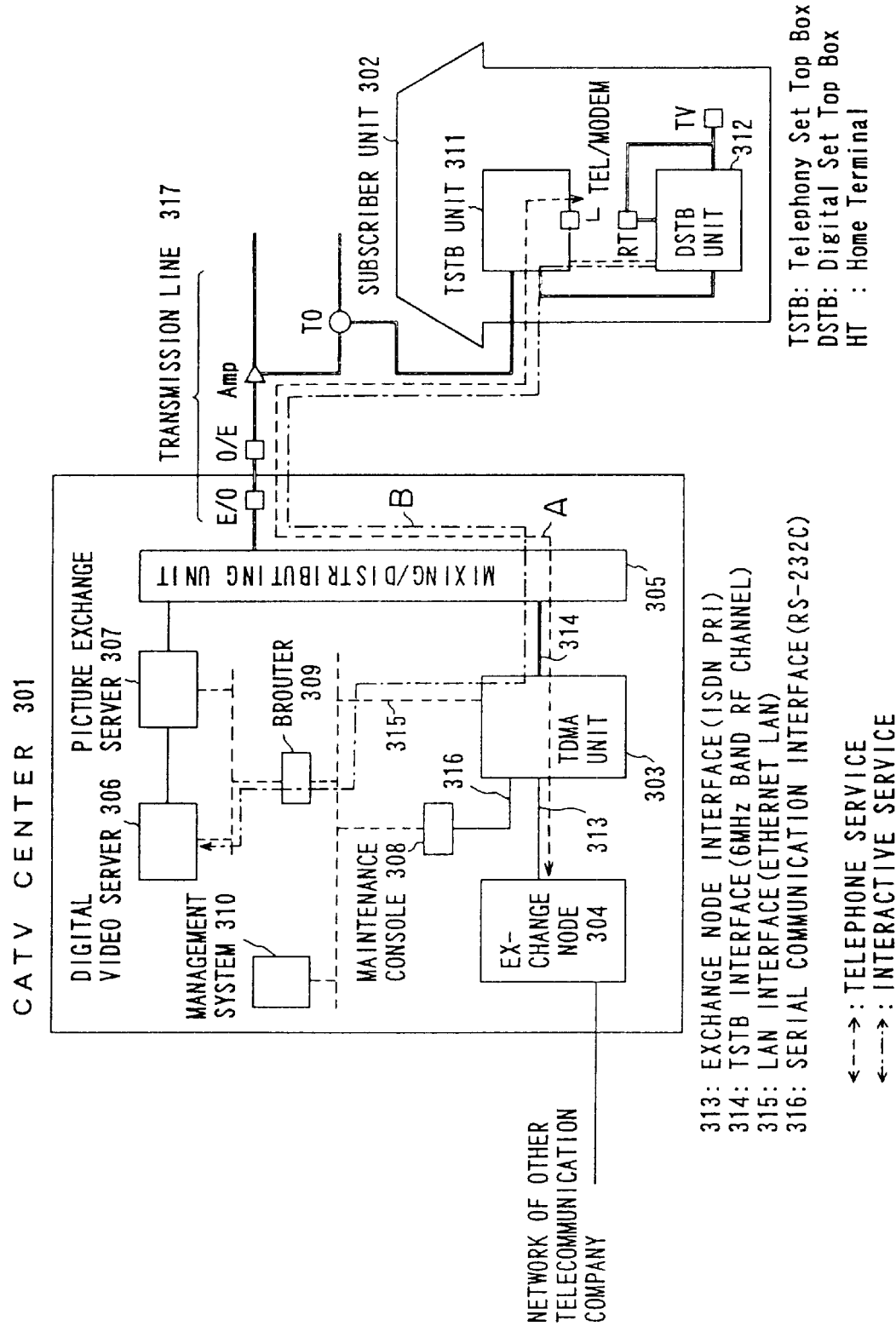
FIG. 3 is a block diagram showing the concept of the system structure of the preferred embodiment of the present invention.

FIG. 2 is a block diagram showing the theory of a preferred embodiment of the present invention.

The present invention relates to a terminal ID assigning system for automatically assigning terminal IDs that are identifiers for uniquely identifying each of a plurality of terminal units on a network having a "1" to "n" connecting function, such as a CATV network, in the system a center unit and the terminal unit bidirectionally communicate.

A first aspect of the present invention has the following structure.

A center unit sends a terminal ID assignment request message for requesting an assignment of a terminal ID through a predetermined control channel in the network (at step 201 shown in FIG. 2).

When a terminal unit that has not been assigned a terminal ID receives the terminal ID assignment request message through the predetermined control channel in the network, the terminal unit sends a terminal ID assignment request acknowledgment message that is an acknowledgment of the received terminal ID assignment request message to the center unit through the predetermined control channel in the network (at steps 202 and 204 shown in FIG. 2).

After the center unit has received the terminal ID assignment request acknowledgment message from the terminal unit through the predetermined control channel in the network, the center unit exchanges messages with the terminal unit and assigns a terminal ID to the terminal unit (at steps 205 to 210 shown in FIG. 2).

According to the structure of the first aspect of the present invention, the center unit primarily sends a terminal ID assignment request message to a terminal unit. Thus, since the center unit can monitor whether or not terminal ID assignment request acknowledgment messages received from terminal units contend, the center unit can properly perform the terminal ID automatic assigning process.

A second aspect of the present invention has the following structure.

A center unit sends a terminal ID assignment request message for requesting an assignment of a terminal ID through a predetermined control channel in the network (at step 201 shown in FIG. 2).

When the power of a terminal unit that has not been assigned a terminal ID is turned on, the terminal unit randomly generates a temporary terminal ID for identifying the terminal ID before the center unit assigns a permanent ID to the terminal unit (at step 203 shown in FIG. 2).

When a terminal unit that has not been assigned a terminal ID receives the terminal ID assignment request message through the predetermined control channel in the network, it sends a terminal ID assignment request acknowledgment message that is an acknowledgment of the received terminal ID assignment request message and that includes the temporary terminal ID generated by the terminal unit to the center unit through the predetermined control channel in the network (at steps 202 and 204 shown in FIG. 2).

After the center unit has received the terminal ID assignment acknowledgment message from the terminal unit through the predetermined control channel in the network, the center unit identifies that a temporary terminal ID is added to the terminal ID assignment request message, exchanges messages with the terminal unit sending the temporary terminal ID, and assigns a permanent terminal ID to the terminal unit based on the temporary terminal ID (at steps 205 to 210 shown in FIG. 2).

According to the structure of the second aspect of the present invention, the center unit identifies that a temporary ID has been randomly generated by a terminal unit and exchanges messages for automatically assigning a permanent terminal ID with the terminal unit. Thus, the center unit can monitor whether or not terminal ID assignment request acknowledgment messages received from terminal units contend.

A third aspect of the present invention has the following structure based on the structure of the first aspect or the second aspect of the present invention.

When a center unit sends a terminal ID assignment request message to a terminal unit, the center unit adds terminal unit selection data with a predetermined number of digits to the terminal ID assignment request message. The value of the terminal unit selection data cyclically varies whenever the center unit sends the terminal ID assignment request message (at step 201 shown in FIG. 2).

When the power of a terminal unit that has not been assigned a terminal ID is turned on, the terminal unit randomly generates a temporary terminal ID thereof (at step 203 shown in FIG. 2).

When the terminal unit that has not been assigned a permanent terminal ID receives the terminal ID assignment request message from the center unit through a predetermined control channel in the network, if the terminal unit selection data with the predetermined number of digits added to the received terminal ID assignment request message accords with the data of a predetermined number of low order digits of the temporary terminal ID generated by the terminal unit, the terminal unit sends a terminal ID assignment request acknowledgment message to the center unit (at steps 202 and 204 shown in FIG. 2).

According to the structure of the third aspect of the present invention, the number of terminal units for which the center unit performs the terminal ID automatic assigning process at the same time can be limited. Since the center unit cyclically varies the value of the terminal unit selection data whenever it sends the terminal ID assignment request message, any terminal unit that is newly connected to the network can perform the terminal ID automatic assigning process soon or later. In addition, the probability of which the terminal ID automatic assigning process causes contention among terminal units can be remarkably decreased.

A fourth aspect of the present invention has the following structure based on the structure of the first aspect or the second aspect of the present invention.

When a center unit receives a terminal ID assignment request acknowledgment message from a terminal unit through a predetermined control channel in the network, the center unit sends a terminal ID assignment success message to the terminal unit through the predetermined control channel in the network (at 205 and 206 shown in FIG. 2). The terminal ID assignment success message represents that the terminal unit has been successfully assigned a permanent terminal ID and has a temporary terminal ID was added to the terminal ID assignment request acknowledgment message.

When the center unit detects a data error of the terminal ID assignment request acknowledgment message received through the predetermined control channel in the network or when the center unit successively receives a plurality of terminal ID assignment request acknowledgment messages, the center unit sends a terminal ID assignment unsuccess message that represents that the terminal ID assigning process has not be successfully performed through the predetermined control channel in the network (at steps 205 and 207 shown in FIG. 2).

When a terminal unit that has not been assigned a permanent terminal ID receives the terminal ID assignment succeed message from the center unit through the predetermined control channel in the network, the terminal unit registers the permanent terminal ID received from the center unit as the permanent terminal ID of the terminal unit (at step 208 shown in FIG. 2).

When a terminal unit that has not been assigned a permanent terminal ID receives the terminal ID assignment unsuccess message through the predetermined control channel in the network, the terminal unit executes a process for the case that the terminal ID automatic assigning process has not been successfully performed (at steps 209 and 210 shown in FIG. 2).

According to the structure of the fourth aspect of the present invention, when the center unit has detected that terminal ID assignment request acknowledgment messages received from a plurality of terminal units contend, the center unit sends the terminal ID assignment unsuccess message to each of the terminal units so as to stop the terminal ID automatic assigning process. Thus, permanent terminal IDs can be prevented from being duplicated.

A fifth aspect of the present invention has the following structure based on the structure of the second aspect of the present invention.

When a center unit receives a plurality of terminal ID assignment request acknowledgment messages through a predetermined control channel in the network, unlike with the case of the fourth aspect of the present invention, the center unit sends a terminal ID assignment success message instead of a terminal ID assignment unsuccess message through the predetermined control channel in the network (at steps 205 and 206 shown in FIG. 2) to the plurality of terminals. The terminal ID assignment success message has a temporary terminal ID added to one of the plurality of terminal ID assignment request acknowledgment messages selected corresponding to a predetermined rule.

When a terminal unit that has not been assigned a terminal ID receives the terminal ID assignment success message through the predetermined control channel in the network, if the temporary terminal ID added to the received terminal ID assignment success message accords with the temporary terminal ID generated by the terminal unit, the terminal unit registers the permanent terminal ID received from the center unit as the permanent terminal ID of the terminal unit (at step 208 shown in FIG. 2).

When a terminal unit that has not been assigned a terminal ID receives the terminal ID assignment unsuccess message through the predetermined control channel in the network or when a terminal unit that has not been assigned a terminal ID receives a terminal ID assignment success message through the predetermined control channel in the network and the temporary terminal ID added to the received terminal ID assignment success message does not accord with the temporary terminal ID generated by the terminal unit, the terminal unit executes a process for the case that the terminal ID automatic assigning process has not been successfully performed (at steps 209 and 210 shown in FIG. 2).

According to the structure of the fifth aspect of the present invention, as with the case of the fourth aspect of the present invention, a terminal ID can be prevented from being duplicated. In addition, when the center unit successively receives a plurality of terminal ID assignment request acknowledgment messages through the predetermined control channel in the network, the center unit continues to execute the terminal ID automatic assigning process corresponding to one of the terminal ID assignment request acknowledgment messages.

A sixth aspect of the present invention has the following structure based on the fourth aspect or the fifth aspect of the present invention.

When a terminal unit that has not been assigned a terminal ID receives a terminal ID assignment unsuccess message through a predetermined control channel in the network (in the case of the fourth aspect and the fifth aspect of the present invention) or when a terminal unit that has not been assigned a permanent terminal ID receives a terminal ID assignment success message through a predetermined control channel in the network and a temporary terminal ID added to the received terminal ID assignment success message does not accord with a temporary terminal ID generated by the terminal unit (in the case of the fifth aspect of the present invention), the center unit activates a timer with a random timing, prohibits any message from being received through the predetermined control channel in the network until the timer times out, and enters a receive waiting state for a terminal ID assignment request message (at step 210 shown in FIG. 2).

According to the structure of the sixth aspect of the present invention, the timer process with the above-described random timing is executed in all terminal units that have contended. Thus, in the next retry state, the terminal units can be prevented from sending the terminal ID assignment request acknowledgment messages at the same time.

A seventh aspect of the present invention has the following structure based on the first aspect to the sixth aspect of the present invention.

A center unit sends a terminal ID assignment request message for requesting an assignment of a terminal ID at intervals of a predetermined time period through a predetermined control channel in the network.

While the center unit is not sending the terminal ID assignment request message, the center unit shares the predetermined control channel in the network for the terminal ID assignment request message with other control signals.

According to the structure of the seventh aspect of the present invention, while the center unit is not sending the terminal ID assignment request message, the center unit can send and receive other control signals such as a normality check process, a carrier level adjusting process, and a distance information adjusting process, through the predetermined control channel in the network. Thus, the predetermined control channel can be effectively utilized.

An eighth aspect of the present invention has the following structure based on the first aspect to the seventh aspect Qf the present invention.

When a terminal unit of which a terminal ID assigning process has been completed calls another terminal unit managed by a center unit, the center unit displays the terminal ID of the calling terminal unit to the called terminal unit.

According to the structure of the eighth aspect of the present invention, when the user of a terminal unit calls a terminal unit using an analog telephone set connected to the user's terminal unit, the terminal ID and the telephone number corresponding thereto can be registered on the called terminal unit side without the need to use a special unit on the called terminal unit side.

The present invention can be applied for a center unit, a terminal unit, or a communications system that uses a method corresponding to the structure of each of the first aspect to the eighth aspect of the present invention.

DESCRIPTION OF PREFERRED EMBODIMENTS

With reference to the accompanying drawings, preferred embodiments of the present invention will be described.

FIG. 3 is a block diagram showing the concept of the structure of a CATV system according to a preferred embodiment of the present invention.

The CATV system shown in FIG. 3 mainly comprises a CATV center 301, a plurality of subscriber units 302, and a transmission line 317. The CATV center 301 is a center unit. The subscriber units 302 are terminal units. The transmission line 317 connects the CATV center 301 and the subscriber units 302.

A digital video server 306 of the CATV center 301 stores digital video programs. A picture exchange server 307 sends the digital video programs to the subscriber units 302.

An exchange node 304 exchanges ISDN signals received from and sent to telephone sets or modems of the subscriber units 302 between the CATV center 301 and a network of another telecommunication company.

A TDMA (Time Division Multiple Access) unit 303 especially relates to the present invention. The TDMA unit 303 performs a terminal ID assigning process. In addition, the TDMA unit 303 exchanges signals between a TSTB (Telephony Set Top Box) interface 314 that is an interface of an RF signal on the transmission line 317 and an exchange node interface 313 that is a PRI (Primary Rate Interface) of an ISDN signal of the exchange node 304.

A mixing/distributing unit 305 mixes RF signals of the picture exchange server 307 and the TDMA unit 303 and sends the resultant signal to the transmission line 317. In addition, the mixing/distributing unit 305 distributes an RF signal received from the transmission line 317 to the picture exchange server 307 and the TDMA unit 303.

A maintenance console 308 is used to assign a telephone number to a terminal ID that has been automatically assigned when a subscriber unit 302, which is a terminal unit, is installed.

A management system 310 is used to manage the entire CATV center 301.

The TDMA unit 303, the maintenance console 308, and the management system 310 are interconnected with a LAN interface 315 that is an interface of an Ethernet local area network. These units are connected to the digital video server 306 and the picture exchange server 307 through a brouter (bridge and router) 309. The maintenance console 308 is directly connected to the TDMA unit 303 with a serial communication interface 316 that is an RS-232C interface.

When the transmission line 317 that connects the CATV center 301 and the subscriber units 302 is structured with optical fiber cables, an electro/optical converter (E/O), an opto/electric (O/E) converter, an amplifier (Amp), a tap-off (TO), and so forth are used. Alternatively, the transmission line 317 can be structured with coaxial cables.

The TSTB unit 311 of the subscriber unit 302, which is a terminal unit, particularly relates to the present invention. When the TSTB unit 311 is initially connected to the transmission line 317, the TSTB unit 311 executes a terminal ID automatic assigning process in association with the TDMA unit 303 in the CATV center 301. When an analog telephone set (TEL) or a modem is connected to the TSTB unit 311, the analog telephone set or the modem terminates sound/data signals communicated between the analog telephone set or the modem of the TSTB unit 311 and an analog telephone set or a modem in the network of another telecommunication company through the TDMA unit 303 in the CATV center 301 and the exchange node 304 as denoted by a dotted line A with arrows shown in FIG. 3.

A DSTB (Digital Set Top Box) unit 312 is connected to the TSTB unit 311. Although the DSTB unit 312 does not directly relate to the present invention, when a television set (TV) and a home terminal (HT) are connected to the DSTB unit 312, as denoted by a dotted line B with arrows shown in FIG. 3, the DSTB unit 312 can bidirectionally communicate with the digital video server 306 through the TDMA unit 303 in the CATV center 301, so as to accomplish a VOD (Video On Demand) service.

Figure 4:
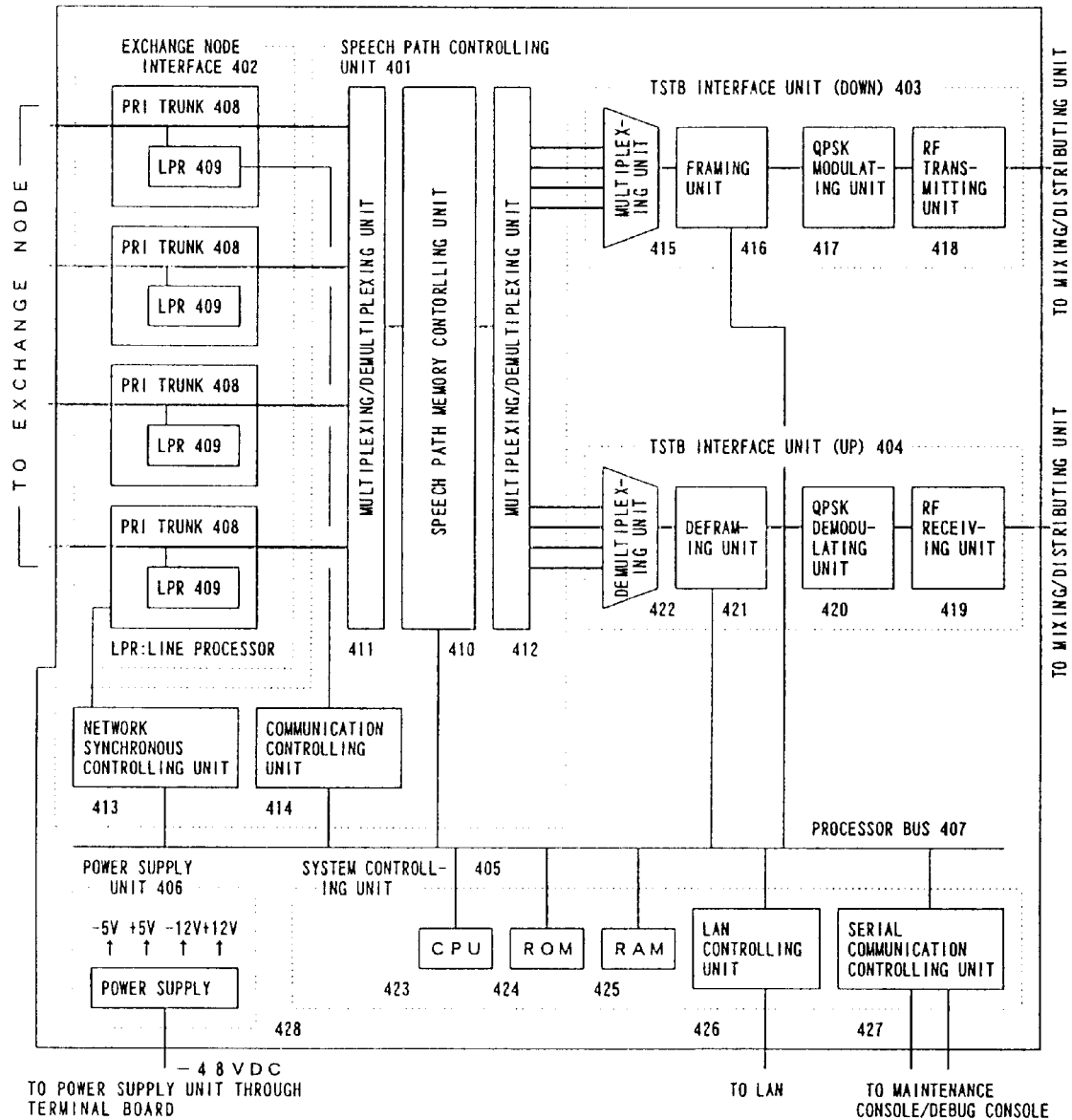
FIG. 4 is a block diagram showing the structure of a TDMA (Time Division Multiple Access) unit.

FIG. 4 is a block diagram showing the structure of the TDMA unit 303 in the CATV center 301 shown in FIG. 3. The TDMA unit 303 mainly comprises a speech path controlling unit 401, an exchange node interface unit 402, a TSTB interface unit (down) 403, a TSTB interface unit (up) 404, a system controlling unit 405, and a power supply unit 406.

The exchange node interface unit 402 is composed of a plurality of PRI trunks 408. The PRI trunks 408 terminate respective ISDN primary rate interfaces (PRIs) having a transmission rate of 1.5 Mbps (Megabits/sec) connected to the exchange node 304 shown in FIG. 3. The terminating process is controlled by an LPR (Line Processor) 409 of each PRI trunk 408. The LPR 409 is controlled by a communication controlling unit 414 of the speech path controlling unit 401. Each PRI is synchronized by a network synchronous controlling unit 413 of the speech path controlling unit 401.

A multiplexing/demultiplexing unit 411 multiplexes ISDN signals received from the individual PRI trunks 408 of the exchange node interface unit 402 and sends the resultant signal to a speech path memory controlling unit 410. In contrast, the multiplexing/demultiplexing unit 411 demultiplexes an ISDN signal received from the speech path memory controlling unit 410 and sends the resultant signals to the individual PRI trunks 408 in the exchange node interface unit 402.

The speech path memory controlling unit 410 exchanges B channels of the exchange node interfaces (PRIs) 313 terminated by the exchange node interface unit 402 with B channels of the TSTB interfaces 314 (see FIG. 3) terminated by the TSTB interface unit (down) 403 and the TSTB interface unit (up) 404 (that will be described later) under the control of the system controlling unit 405. The B channels send sound signals or data signals.

The multiplexing/demultiplexing unit 412 multiplexes ISDN signals of the exchange node interfaces (PRIs) received from the speech path memory controlling unit 410 and sends the resultant signal to a target TSTB interface unit (down) 403. In contrast, the multiplexing/demultiplexing unit 412 demultiplexes an ISDN signal received from the TSTB interface unit (up) 404 and sends the resultant signals to the speech path memory controlling unit 410.

The TSTB interface unit (down) 403 is composed of a multiplexing unit 415, a framing unit 416, a QPSK modulating unit 417, and an RF transmitting unit 418. When the framing unit 416 receives an ISDN signal from the multiplexing/demultiplexing unit 412 through the multiplexing unit 415, the framing unit 416 assembles a frame of the B channel of the ISDN signal of the TSTB interfaces 314 (see FIG. 3). The frame is QPSK-modulated by the QPSK modulating unit 417. The RF transmitting unit 418 converts the modulated signal into an RF channel signal and sends the RF channel signal to the transmission line 317.

On the other hand, the TSTB interface unit (up) 404 is composed of an RF receiving unit 419, a QPSK demodulating unit 420, a deframing unit 421, and a demultiplexing unit 422. When the RF receiving unit 419 receives an RF channel signal from the transmission line 317, the RF receiving unit 419 extracts a QPSK-modulated signal from the RF channel signal. Thereafter, the QPSK demodulating unit 420 demodulates the frame of the TSTB interface 314 with the QPSK-modulated signal. The deframing unit 421 disassembles the frame, extracts the B channel signals from the frame, and generates ISDN signals containing B channel signals. The resultant ISDN signals are supplied to the multiplexing/demultiplexing unit 412 through the demultiplexing unit 422.

The system controlling unit 405 is connected to the speech path memory controlling unit 410, the network synchronous controlling unit 413, and the communication controlling unit 414 of the speech path controlling unit 401, the framing unit 416 of the TSTB interface unit (down) 403, and the deframing unit 421 of the TSTB interface unit (up) 404 through a processor bus 407. The system controlling unit 405 controls these units. The system controlling unit 405 is composed of a CPU 423, a ROM 424, a RAM 425, a LAN controlling unit 426, and a serial communication controlling unit 427 that are interconnected with the processor bus 407.

The CPU 423 uses the RAM 425 as a work area corresponding to a control program stored in the ROM 424 so as to execute a conventional B channel exchange controlling process. In addition, the CPU 423 executes a terminal ID automatic assigning process corresponding to an operational flowchart shown in FIG. 17 (that will be described later).

The LAN controlling unit 426 terminates the LAN interface 315 shown in FIG. 3. The serial communication controlling unit 427 terminates the serial communication interface 316 shown in FIG. 3.

The power supply unit 406 is connected to a power supply through a terminal board (not shown). A power supply 428 supplies various voltages to individual units of the TDMA unit 303.

FIG. 5 is a block diagram showing the function corresponding to a control program stored in the ROM 324 executed by the CPU 423. FIG. 6 is a schematic diagram showing the structures of a transmitting frame memory unit 601 and a receiving frame memory unit 602 that compose a part of the RAM 425.

The transmitting frame memory unit 601 (shown in FIG. 6) that composes a part of the RAM 425 stores B channel which are composed of 95 sound/data channels, control channels (C and D channels), and a maintenance channel (M channel) as a down frame of the down transmission line 317. The maintenance channel especially relates to the present invention.

Likewise, the receiving frame memory unit 602 (shown in FIG. 6) that composes a part of the RAM 425 stores B channel which are composed of 95 sound/data channels, control channels (C and D channels), a maintenance channel (M channel), and a control ACK channel for acknowledgment as an up frame of the up transmission line 317. The maintenance channel and the ACK channel especially relate to the present invention.

In FIG. 5, a control message processing unit 504 executes a terminal ID automatic assigning process corresponding to an operational flowchart shown in FIG. 17.

A transmitting unit 501 stores various control messages sent from the control message processing unit 504 to a control channel (the C channel or D channel) or the maintenance channel (the M channel) that composes a part of a down frame of the down transmission line 317, and writes the resultant channel data to the transmitting frame memory unit 601 shown in FIG. 6.

A receiving unit 503 extracts various control messages from the control channel data of the receiving frame memory 602 shown in FIG. 6 and sends these messages to the control message processing unit 504.

An ACK receiving unit 502 extracts various acknowledgment messages from the control ACK channel for acknowledgment data of the receiving frame memory 602 and sends these messages to the control message processing unit 504.

FIG. 10 is a table showing an example of the structure of the TSTB interface 314 (see FIG. 3) of the transmission line 317.

As the transmission medium of the transmission line 317, coaxial cables (HFC) are used. Alternatively, as the transmission medium, optical fiber cables may be used.

The transmission rate of the transmission line is, for example, 8.192 Mbps.

As an RF channel of the up transmission line 317 in which signals are transmitted from each subscriber unit 302 to the CATV center 301, one of five channels in the frequency band ranging from 10 MHz to 50 MHz is used. As an RF channel of the down transmission line 317 in which signals are transmitted from the CATV center 301 to each subscriber unit 302, one of 54 channels in the frequency band ranging from 222 MHz to 550 MHz is used.

As an access method, the up transmission line 317 uses the TDMA (Time Division Multiple Access) method, whereas the down transmission line 317 uses the TDM (Time Division Multiple) method.

As a modulation method, the QPSK modulation method is used with a data transmission rate 4.096 Mbaud.

Each frame of the TSTB interface 314 of the up transmission line 317 has a data length of 4096 bytes and a period of 4 ms as shown in FIG. 11. On the other hand, the TSTB interface of the down transmission line 317 uses a multi-frame composed of 32 frames having a data length of 128 bytes and a period of 125 µs as shown in FIG. 12.

The frame data of the up transmission line 317 has a format as shown in FIG. 11.

An M channel in a maintenance/distance data portion shown in FIG. 11(1) has a transmission rate of 16 kbps. The M channel that is especially relates to the present invention is used for maintenance/distance measurement.

A C channel shown in FIG. 11(2) has a transmission rate of 128 kbps. The C channel is used for interactively controlling a VOD service.

A D channel shown in FIG. 11(3) has a transmission rate of 64 kbps. The D channel is used for controlling a call of the B channel.

Each of the 95 B channels shown in FIG. 11(4) has a transmission rate of 64 kbps. The B channels are used for sound/data.

An ACK-C channel shown in FIG. 11(5) has a transmission rate of 10 kbps. The ACK-C channel is used for an acknowledgment of a C channel data frame.

An ACK-D channel shown in FIG. 11(6) has a transmission rate of 10 kbps. The ACK-D channel is used for an acknowledgment of a D channel data frame.

Each of the channels shown in FIGS. 11(1) to (3), (5) and (6), is composed of a gap bit (guard timing bit) G, a synchronous signal portion SY, and a data portion. The synchronous signal portion SY is composed of synchronous bits (preamble) PRT (of which all bits are "1") and a unique word portion UW (having a value of "11100011"). The data portion is composed of a terminal ID portion, a data portion DATA, and a CRC (Cyclic Redundancy Code) portion. The data portion DATA of the M channel shown in FIG. 11(1) is composed of a command portion of one octet length and a parameter portion of three octets length. Details of the structure of the M channel will be described later with reference to FIGS. 13 to 16. Each of the B channels shown in FIG. 11(4) have a data portion of 256 bits along with the above-described gap bits G and the synchronous signal portion SY.

The frame data of the down transmission line 317 has a format as shown in FIG. 12.

A frame/multi-frame synchronous bits signal (F/MF) shown in FIG. 12(1) is a signal composed of 16 bits. The signal is used to synchronize each frame or each multi-frame.

An M channel shown in FIG. 12(2) has a transmission rate of 16 kbps. The M channel is used for maintenance/distance measurement.

A C channel shown in FIG. 12(3) has a transmission rate of 240 kbps. The C channel is used for interactively controlling a VOD service.

A D channel shown in FIG. 12(4) has a transmission rate of 120 kbps. The D channel is used for controlling a call of the B channel.

Each of the 95 B channels shown in FIG. 12(5) has a transmission rate of 64 kbps. The B channels are used for sound/data.

Each of the channels shown in FIGS. 12(2) to 12(4) is composed of a terminal ID portion, a data portion DATA, and a CRC portion. The data portion DATA of the M channel that especially relates to the present invention is composed of a command portion of one octet length and a parameter portion of three octets length. The details of the data portion DATA will be described with reference to FIGS. 13 to 16. Each of the B channels shown in FIG. 12(5) has a data portion of eight bits.

In the TDMA unit 303, after each B channel signal for sound/data of the up transmission line 317 is received by the TSTB interface unit (up) 404, the B channel signal is sent to the exchange node 304 through the speech path controlling unit 401 and the exchange node interface unit 402. In contrast, each B channel signal of the down transmission line 317 is received by the TSTB interface unit (down) 403 from the exchange node 304 through the exchange node interface unit 402 and the speech path controlling unit 401.

The VOD service interactive control C channel signal and ACK-C channel signal of the up transmission line 317 are received by the TSTB interface unit (up) 404, extracted by the deframing unit 421, and then sent to the digital video server 306 shown in FIG. 3 through the LAN controlling unit 426 by the CPU 423 of the system controlling unit 405. In contrast, the C channel signal of the down transmission line 317 is sent by the CPU 423 of the system controlling unit 405 from the digital video server 306 to the framing unit 416 of the TSTB interface unit (down) 403 through the LAN controlling unit 426 and then output to the down transmission line 317.

The D channel signal and ACK-D channel signal of the up transmission line 317 are received by the TSTB interface unit (up) 404, extracted by the deframing unit 421, and then processed by the CPU 423 of the system controlling unit 405. In contrast, the D channel signal of the down transmission line 317 is sent to the framing unit 416 of the TSTB interface unit (down) 403 by the CPU 423 of the system controlling unit 405 and then output to the down transmission line 317.

The M channel signal for maintenance/distance measurement of the up transmission line 317 is received by the TSTB interface unit (up) 404, extracted by the deframing unit 421, and then processed by the CPU 423 of the system controlling unit 405. In contrast, the M channel signal of the down transmission line 317 is sent to the framing unit 416 of the TSTB interface unit (down) 403 by the CPU 423 of the system controlling unit 405 and then output to the down transmission line 317. The process for the M channel signal includes the terminal ID automatic assigning process corresponding to the present invention. The terminal ID automatic assigning process will be described later with reference to a flowchart shown in FIG. 17.

Figure 7:
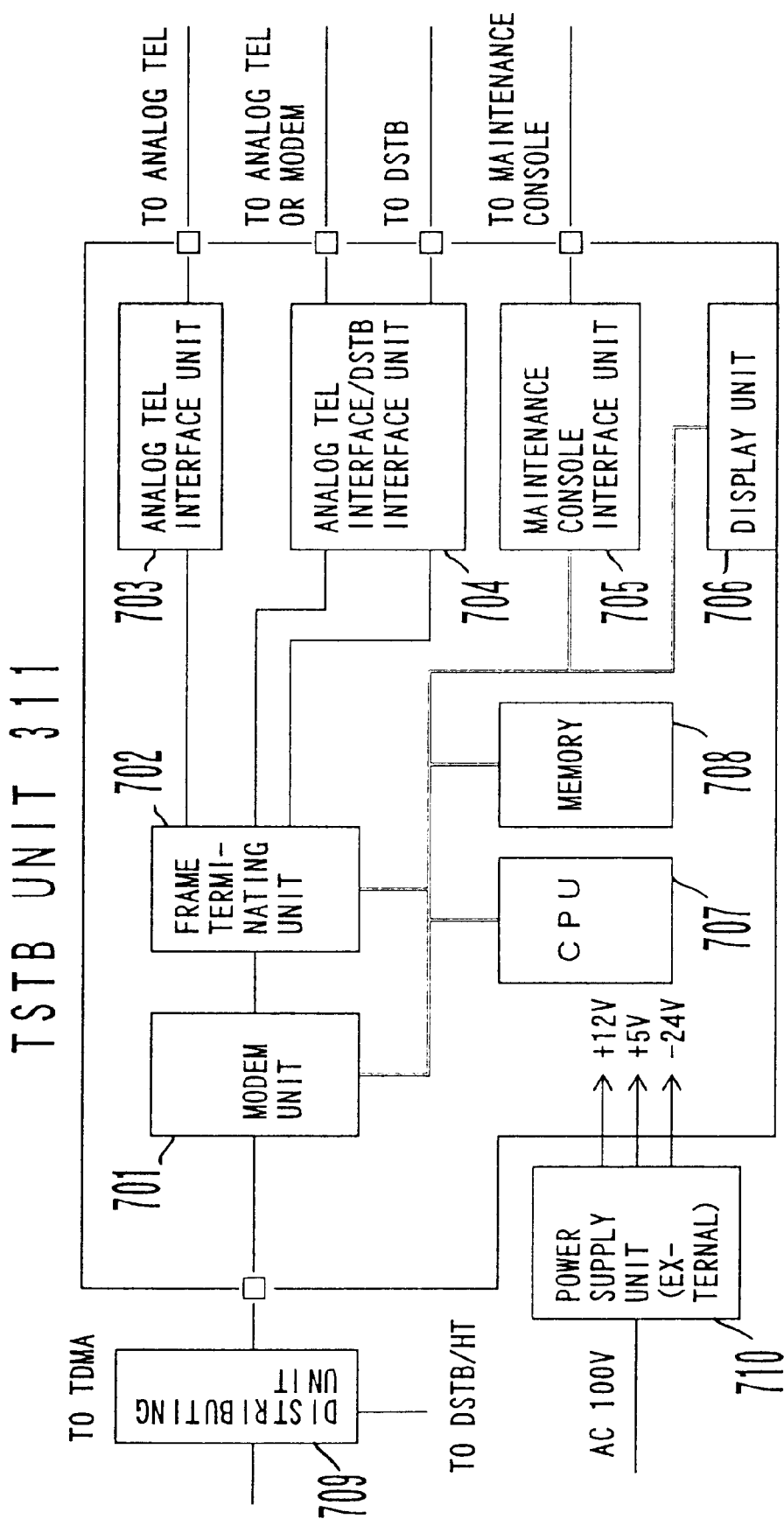
FIG. 7 is a block diagram showing the structure of a TSTB (Telephony Set Top Box) unit.

FIG. 7 is a block diagram showing the structure of the TSTB unit 311 of the subscriber unit 302 shown in FIG. 3.

A distributing unit 709 disposed outside the TSTB unit 311 distributes a signal of the TSTB interface 314 (see FIG. 3) of the transmission line 317 to the TSTB unit 311. In addition, the distributing unit 709 distributes a VOD service signal to the DSTB unit 312. An external power supply unit 710 connected to a 100 volts AC outlet supplies power to the TSTB unit 311.

When a modem unit 701 of the TSTB unit 311 receives an RF channel signal from the down transmission line 317 through the distributing unit 709, the modem unit 701 extracts a QPSK-modulated signal from the RF signal, demodulates a frame of the TSTB interface 314 with the QPSK-modulated signal, and sends the frame to a frame terminating unit 702. In contrast, the modem unit 701 QPSK-modulates a frame received from the frame terminating unit 702, converts the modulated signal into an RF channel signal of the transmission line 317, and outputs the RF signal to the up transmission line 317 through the distributing unit 709.

The frame terminating unit 702 disassembles a frame received from the modem unit 701, extracts channel signals from the frame, and sends the channel signals to an analog TEL interface unit 703, an analog TEL interface/DSTB interface unit 704, and a CPU 707. In contrast, the frame terminating unit 702 assembles channel data received from the analog TEL interface unit 703, the analog TEL interface/DSTB interface unit 704, and the CPU 707, and sends the assembled frame to the modem unit 701. In practice, the frame terminating unit 702 sends each B channel signal for sound/data (see FIGS. 10 and 12 (5)) of the down transmission line 317 to the analog TEL interface unit 703 or the analog TEL interface/DSTB interface unit 704. The analog TEL interface unit 703 and the analog TEL interface/DSTB interface unit 704 convert the B channel signal received from the frame terminating unit 702 into an analog telephone sound signal and output the resultant signal to the analog telephone set or the modem. In contrast, the analog TEL interface unit 703 and the analog TEL interface/DSTB interface unit 704 convert an analog telephone sound signal received from the analog telephone set or the modem into B channel signal and sends the resultant signal to the frame terminating unit 702. The frame terminating unit 702 sends the B channel signal as a B channel signal (see FIGS. 10 and 11(4)) of the up transmission line 317 to the modem unit 701.

The frame terminating unit 702 sends the VOD service interactive control C channel data (see FIGS. 10 and 12(3)) of the down transmission line 317 to the analog TEL interface unit 703 or the analog TEL interface/DSTB interface unit 704. The analog TEL interface/DSTB interface unit 704 sends the C channel signal received from the frame terminating unit 702 to the DSTB unit 312 (see FIG. 3). In contrast, the analog TEL interface/DSTB interface unit 704 sends the C channel signal and ACK-C channel signal received from the DSTB unit 312 to the frame terminating unit 702. The frame terminating unit 702 sends each received channel signal as the C channel signal and ACK-C channel signal (see FIGS. 10, 11(2) and 11(5)) to the modem unit 701.

The frame terminating unit 702 sends the D channel signal for controlling a call of the B channel (see FIGS. 10 and 12(4)) of the down transmission line 317 to the CPU 707.

The CPU 707 processes the D channel signal received from the frame terminating unit 702. In contrast, the CPU 707 sends the generated D channel signal and ACK-D channel signal to the frame terminating unit 702.

The frame terminating unit 702 sends each received channel data as the D channel signal and ACK-D channel signal (see FIGS. 10, 11(3), and 11(6)) of the up transmission line 317 to the modem unit 701.

The frame terminating unit 702 sends the M channel signal for maintenance/distance measurement of the down transmission line 317 (see FIGS. 10 and 12(2)) to the CPU 707. The CPU 707 processes the M channel signal received from the frame terminating unit 702. In contrast, the CPU 707 sends the generated M channel signal to the frame terminating unit 702. The frame terminating unit 702 sends the received M channel signal as the M channel signal (see FIGS. 10 and 11(1)) of the up transmission line 317 to the modem unit 701. The process for the M channel signal by the CPU 707 includes the terminal ID automatic assigning process according to the present invention. The terminal ID automatic assigning process will be described later with reference to an operational flowchart shown in FIG. 18.

A terminal ID is stored to a non-volatile memory 708.

FIG. 8 is a block diagram showing the function accomplished by the CPU 707. FIG. 9 is a schematic diagram showing the structures of a transmitting frame memory unit 901 and a receiving frame memory unit 902 that compose a part of the memory 708.

The transmitting frame memory unit 901 (shown in FIG. 9) that composes a part of the memory 708 stores data of each sound/data channel (95 B channels), control channels (C channel/D channel), a maintenance channel (M channel), and a control ACK channel for acknowledgment. The maintenance channel and the control ACK channel for acknowledgment particularly relates to the present invention. The data of these channels composes an up frame of the up transmission line 317.

Likewise, the receiving frame memory unit 902 (shown in FIG. 9) that composes a part of the memory 708 stores data of each sound/data channel (95 B channels), control channels (C channel/D channel), and a maintenance channel (M channel). The data of these channel composes a down frame of the down transmission line 317.

Figure 18:
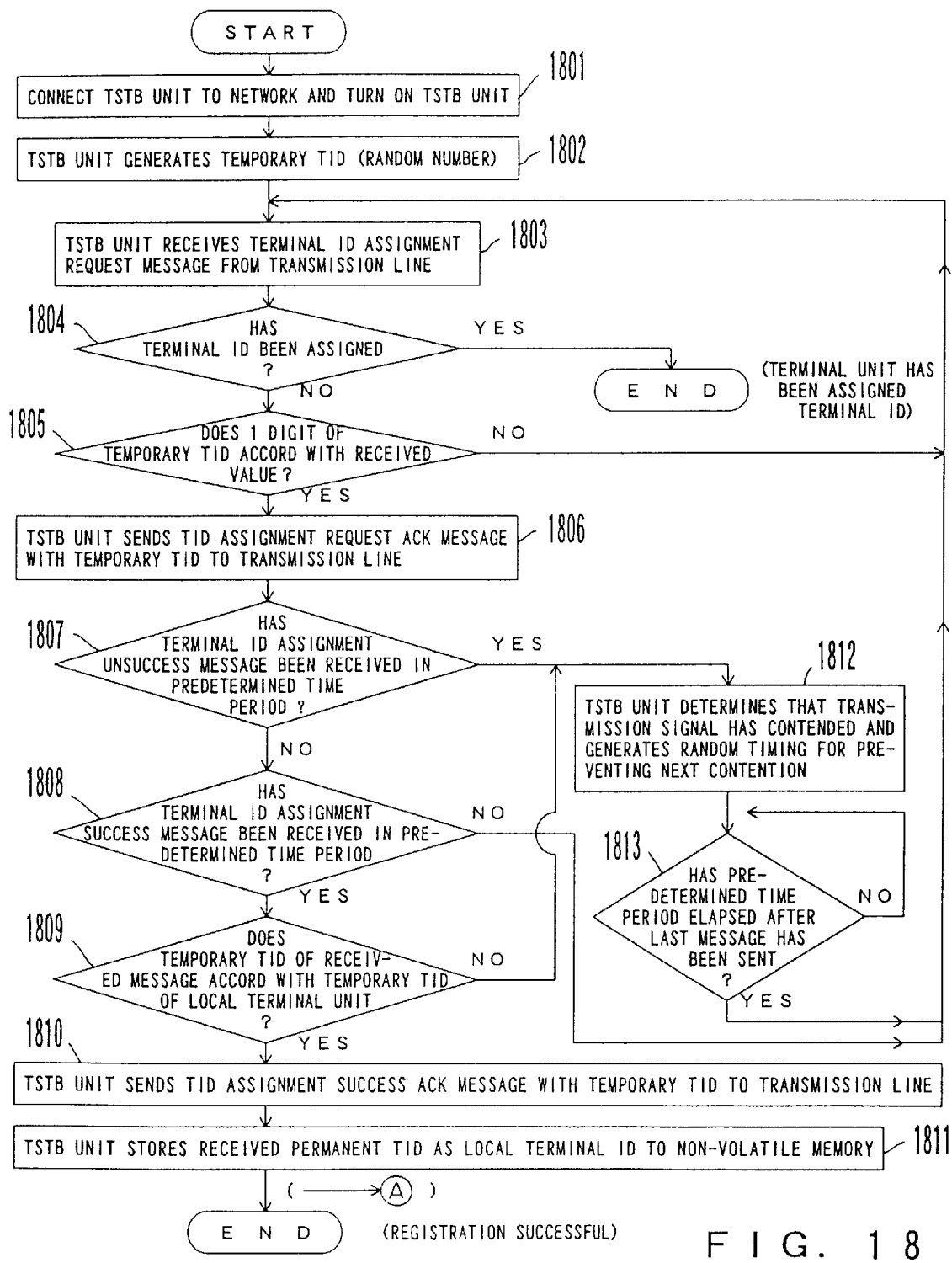
FIG. 18 is a flowchart showing an operation of the TSTB unit with respect to the terminal ID automatic assigning process.

In FIG. 8, the control message processing unit 804 accomplishes the terminal ID automatic assigning process corresponding to a flowchart shown in FIG. 18.

A transmitting unit 801 assigns various control messages received from a control message processing unit 804 to a control channel (C channel/D channel) or a maintenance channel (M channel) that composes an up frame of the up transmission line 317 and writes the resultant channel data to the transmitting frame memory unit 901 shown in FIG. 9.

A receiving unit 803 extracts various control messages from the control channel data received from the receiving frame memory 902 shown in FIG. 9 and sends the extracted control messages to the control message processing unit 804.

An ACK transmitting unit 802 generates various acknowledgment messages corresponding to the control channel data received by the receiving frame memory unit 902, assigns these acknowledgment messages to the control ACK channel for acknowledgment, and writes the resultant channel data to the transmitting frame memory unit 901.

<Terminal ID automatic assigning process>

Next, the terminal ID automatic assigning process according to the preferred embodiment of the present invention will be described in detail.

FIG. 13 is a schematic diagram showing examples of the frame formats of control messages notified with the M channel (see FIGS. 10 to 12) of the transmission line 317 with respect to the terminal ID automatic assigning process. FIG. 14 is a table showing commands in these control messages. FIGS. 15 and 16 are schematic diagrams showing command parameters of the control messages.

FIG. 17 is a flowchart showing a control operation executed by the CPU 423 of the system controlling unit 405 of the TDMA unit 303 (see FIGS. 3 and 4) with respect to the terminal ID automatic assigning process. The control operation corresponding to the flowchart is accomplished by the CPU 423 that executes a control program stored in the ROM 424 (see FIG. 4) using the working memory of the RAM 425.

FIG. 18 is a flowchart showing a control operation executed by the CPU 707 of the TSTB unit 311 (see FIGS.

3 and 7) with respect to the terminal ID automatic assigning process. The control operation corresponding to the flowchart is accomplished by the CPU 707 that executes a control program stored in a ROM (not shown) of the CPU 707.

<Normal sequence>

With reference to operational flowcharts shown in FIGS. 17 and 18, a normal sequence of the terminal ID automatic assigning process will be described corresponding to a sequence chart shown in FIG. 19.

Figure 19:
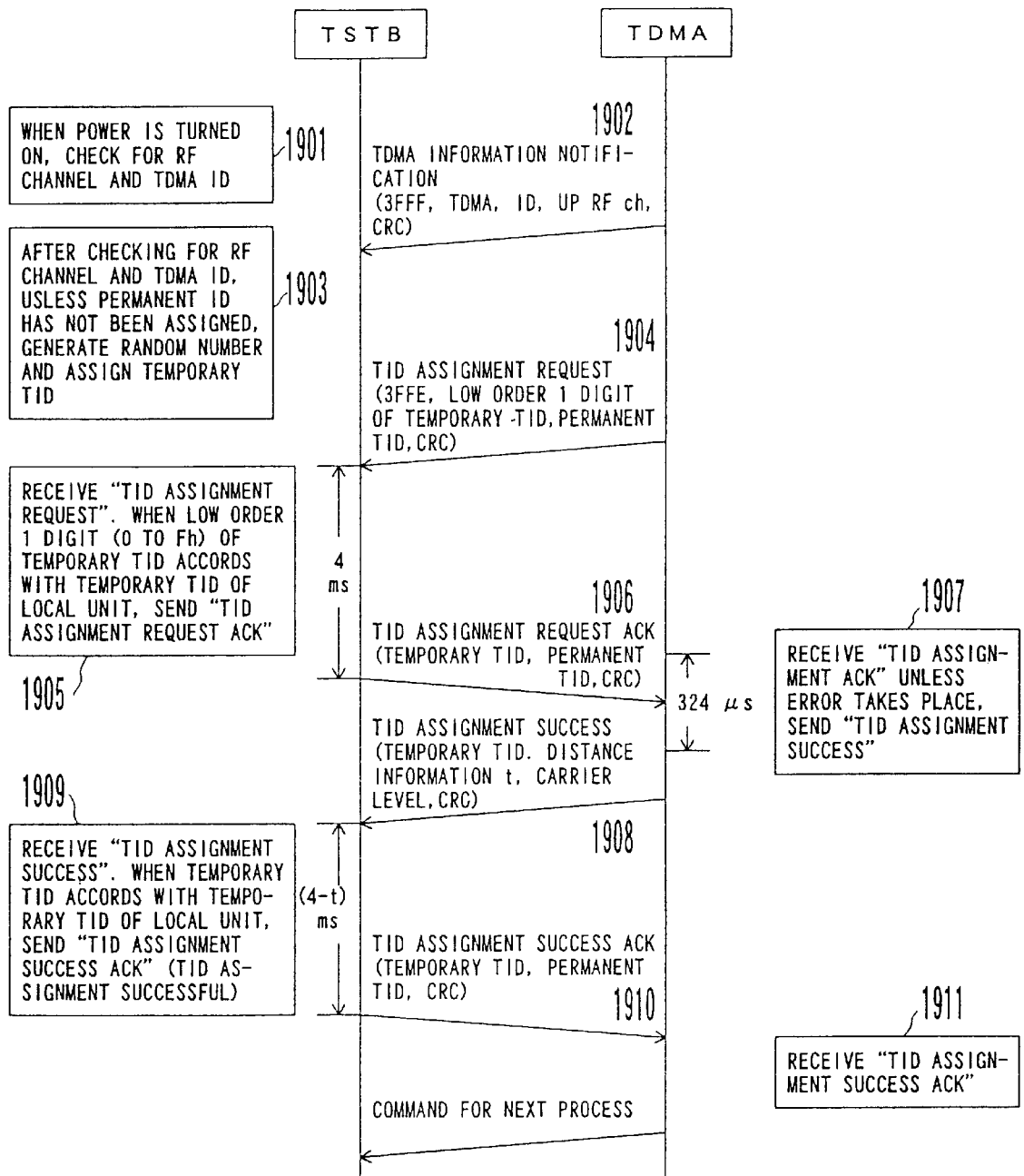
FIG. 19 is a sequence chart showing an example of the sequence of the terminal ID automatic assigning process (normal sequence)

When the TSTB unit 311 shown in FIG. 3 is initially connected to the distributing unit 709 shown in FIG. 7 that is connected to the transmission line 317, and the power of the TSTB unit 311 is turned on, the CPU 707 of the TSTB unit 311 executes a process for checking for a TDMA-ID that is an ID of the TDMA unit 303 of the CATV center 301 (at step 1801 shown in FIG. 18 and at step 1901 shown in FIG. 19). To accomplish this process, the CPU 423 of the TDMA unit 303 periodically sends a TDMA information notification message to the transmission line 317 (at step 1902 shown in FIG. 19).

This message is sent through the framing unit 416 (see FIG. 4) of the TSTB interface unit (down) 403 using the M channel (see FIGS. 10 and 12(2)) of the down transmission line 317.

As shown in FIG. 12(2), the M channel data is composed of a header portion of two octets length which stores a terminal ID (TID), a data portion of four octets length which is composed of a command of one octet length and a parameter of three octets length, and a CRC of two octets length which is used to detect and correct an error.

When the TDMA information notification message is sent, as shown in FIGS. 13(a) and 14(a), a code "3FFF" as a terminal ID of two octets length that represents that the M channel data is a broadcast global message is stored in the header portion of the M channel data. In addition, as shown in FIG. 15(a), as a command of a data portion, a code "01" (Hex) represents a TDMA information notification is stored. As parameters of the data portion, a TDMA-ID (0 to F(Hex)) of four bits and a value (1 to 7 (Hex)) of four bits that represent an RF channel is used in the up transmission line 317, are stored.

The CPU 707 receives the TDMA information notification message of the M channel from the down transmission line 317 through the modem unit 701 and the frame terminating unit 702 shown in FIG. 7 so as to check for the RF channel of the up transmission line 317 and the TDMA-ID.

After the CPU 707 has checked for the RF channel and the TDMA-ID, it generates a random number so as to generate a temporary TID (at step 1802 shown in FIG. 18 and at step 1903 shown in FIG. 19).

While the CPU 423 of the TDMA unit 303 is cyclically varying the low order one digit of the temporary TID (I) (Hex) (at step 1701 shown in FIG. 17), it sends the terminal ID assignment request message (TID assignment request message) for designating a low order one digit (I) of the temporary TID to the down transmission line 317 (in a loop from steps 1701 to 1704 shown in FIG. 17 and at step 1904 shown in FIG. 19).

The low order one digit (I) of the temporary TID ranges from 0 to 15. At step 1701 shown in FIG. 17, the value I is incremented by 1 from 0. When the value I exceeds 15, it is reset to 0. As will be described later, to disperse the terminal ID automatic assigning process for TSTB units 311 (subscriber units 302) that are newly connected, the low order one digit of the temporary TID is assigned.

The TID assignment request message is sent with the M channel (see FIGS. 10 and 12(2)) of the down transmission line 317 through the framing unit 416 (see FIG. 4) of the TSTB interface unit (down) 403.

In this case, a code "3FFE" that represents that the M channel data is a terminal ID automatic assignment global message, is stored in the header portion of the M channel data as shown in FIGS. 13(b) and 14(b). In addition, as shown in FIG. 15(b), as a command of the data portion, a code 11 (Hex) that represents a TID assignment request is stored. As parameters of the data portion, a value of four bits (I="0" to "F" (Hex)) that represents the low order one digit of the temporary TID, and a value of 13 bits ("0001" to "1FFF" (Hex)) that represents a permanent terminal ID (permanent TID), are stored. The permanent TID represents a value of a terminal ID that the CPU 423 newly assigns to a TSTB unit 311 (subscriber unit 302) that is newly connected to the transmission line 317.

On the other hand, after the CPU 707 of the TSTB unit 311 has generated a temporary TID, the CPU 707 receives the TID assignment request message of the M channel from the down transmission line 317 through the modem unit 701 and the frame terminating unit 702 (at step 1803 shown in FIG. 18 and at step 1905 shown in FIG. 19). After the CPU 707 has received the message, the CPU 707 determines whether or not the local unit has been assigned a terminal ID (at step 1804 shown in FIG. 18 and at 1905 shown in FIG. 19). When the CPU 707 determines that the local unit has been assigned a terminal ID, since the CPU 707 does not need to execute the terminal ID automatic assigning process, the CPU 707 completes the control operation corresponding to the operational flowchart shown in FIG. 18. When the CPU 707 determines that the local unit has not been assigned a terminal ID, the CPU 707 determines whether or not the low order one digit (I) of the temporary TID of the message accords with the low order one digit of the temporary TID generated by the local unit (at step 1802 shown in FIG. 18 and at step 1905 shown in FIG. 19). When the determined result shows accordance, the CPU 707 does not execute the terminal ID automatic assigning process. Instead, the CPU 707 waits for the next TID assignment request message (the flow returns to step 1803 shown in FIG. 18). When the determined result doesn't show accordance, the CPU 707 executes the terminal ID automatic assigning process (at step 1806 shown in FIG. 18 and at step 1905 shown in FIG. 19).

In such a manner, according to the preferred embodiment, the TID assignment request message that is sent from the TDMA unit 303 to the down transmission line 317 represents the low order one digit (I) of the temporary TID. Only the TSTB unit 311 of which the low order one digit of the temporary TID randomly generated by the local unit accords with the low order one digit (I) of the temporary TID of the TID assignment request message executes the terminal ID automatic assigning process. Thus, the number of terminal units that execute the process at the same time can be restricted. As described above, since the TDMA unit 303 cyclically varies the low order one digit (I) of the temporary TID in the range from 0 to 15 and sends the TID assignment request message at intervals of the predetermined time period, a TSTB unit 311 (subscriber unit 302) that is newly connected to the transmission line 317 can execute the terminal ID assigning process sooner or later. In addition, the probability of which the process causes contention can be decreased to $\frac{1}{16}$.

When the CPU 707 has determined that the low order one digit (I) of the temporary TID of the TID assignment request message accords with the low order one digit of the temporary TID generated by the local unit, the CPU 707 sends a TID assignment request ACK message having the permanent TID of the received TID assignment request message and the temporary TID generated by the local unit to the up transmission line 317 (at step 1806 shown in FIG. 18 and at steps 1905 and 1906 shown in FIG. 19).

The TID assignment request ACK message is sent with the M channel (see FIGS. 10 and 11(1)) of the up transmission line 317 through the frame terminating unit 702 (see FIG. 7).

As shown in FIG. 11(1), the M channel data is composed of a header portion of two octets length which stores a terminal ID (TID), a data portion of four octets length which is composed of a command of one octet length and a parameter of three octets length, and a CRC of two octets length which is used to detect and correct an error.

When the TID assignment request ACK message is sent, as shown in FIGS. 13(c) and 14(c), the temporary TID ("2000" to "3FEF") generated by the CPU 707 is stored in the header portion of the M channel data. In addition, as shown in FIG. 15(c), as a command of the data portion, a code "11" (Hex) that represents the TID assignment request ACK message is stored. As a parameter of the data portion, a value ("0001" to "1FFF" (Hex)) of 13 bits that represents the permanent TID is stored.

The TID assignment request ACK message includes the permanent TID so that it can be checked. An internal register or the like of the CPU 707 stores the permanent TID.

On the other hand, while the CPU 423 of the TDMA unit 303 is sending the TID assignment request message at intervals of the predetermined time period (in a loop from steps 1701 to 1704 shown in FIG. 17), the CPU 423 monitors whether or not the TID assignment request ACK message has been received (at step 1704 shown in FIG. 17). This message is received with the M channel (see FIGS. 10 and 11(1)) of the up transmission line 317 through the deframing unit 421 (see FIG. 4) of the TSTB interface unit (up) 404.

When the CPU 423 receives the TID assignment request ACK message from the up transmission line 317, the CPU 423 checks for the CRC of the message so as to determine whether or not a transmission error has taken place (at step 1705 shown in FIG. 17 and at step 1907 shown in FIG. 19). When a plurality of TSTB units 311 acknowledge one TID assignment request message sent from the TDMA unit 303 to the down transmission line 317, and these TSTB units 311 send respective TID assignment request ACK messages to the up transmission line 317 at the same time, frames contend on the up transmission line 317. Thus, a transmission error takes place.

When the determined result of step 1705 is No, the CPU 423 determines whether or not the TID assignment request ACK messages have been successively received (at step 1707 shown in FIG. 17 and at step 1907 shown in FIG. 19). When a plurality of TSTB units 311 have acknowledged one TID assignment request message sent from the TDMA unit 303 to the down transmission line 317, and they have sent respective TID assignment request ACK messages to the up transmission line 317, if the distance between each of the TSTB units 311 is long, the TID assignment request ACK messages sent from the TSTB to the up transmission line 317 occasionally may not contend. Thus, the TDMA unit 303 may receive the TID assignment request ACK messages. In the determining step, the CPU 423 checks for such a situation.

When the determined result at step 1707 is Yes, the CPU 423 treats only a message that has been received first as a valid message (at step 1708 shown in FIG. 17).

When the determined result at step 1707 is No or when the CPU 423 has determined that a plurality of the TID assignment request ACK messages have been received and the CPU 423 has treated only the message that has been received first as a valid message, the CPU 423 sends a TID assignment success message that has the temporary TID of the received TID assignment request ACK message to the down transmission line 317 (at step 1709 shown in FIG. 17 and at steps 1907 and 1908 shown in FIG. 19).

The TID assignment success message is sent with the M channel (see FIGS. 10 and 12(2)) of the down transmission line 317 through the framing unit 416 (see FIG. 4) of the TSTB interface unit (down) 403.

In this case, as shown in FIGS. 13(c) and 14(c), the temporary TID ("2000" to "3FEF") is stored in the header portion of the M channel data. In addition, as shown in FIG. 16(d), as a command of the data portion, a code "12" (Hex) that represents a TID assignment success message is stored. As parameters of the data portion, a value ("0000" to "FFFF" (Hex): −32768 to +32768 (Dec)) of two octets length that represents the result of the distance measurement and a value (0 to F (Hex): −8 to +7 (Dec)) of one octet length that represents a carrier level are stored. Since the result of the distance measurement and the carrier level do not directly relate to the present invention, their description is omitted.

On the other hand, after the CPU 707 of the TSTB unit 311 has sent the TID assignment request ACK message to the up transmission line 317, the CPU 707 monitors whether a TID assignment unsuccess message (that will be described later) or the TID assignment success message has been received from the down transmission line 317 in a predetermined time period (at steps 1807 and 1808 shown in FIG. 18).

These messages are received with the M channel (see FIGS. 10 and 12(2)) of the down transmission line 317 through the frame terminating unit 702 (see FIG. 7) of the TSTB unit 311.

When the CPU 707 has received the TID assignment success message in the predetermined time period, the CPU 707 determines whether or not the temporary TID of the message accords with the temporary TID (at step 1802 shown in FIG. 18) of the temporary TID generated by the local unit (at step 1809 shown in FIG. 18 and at step 1909 shown in FIG. 19). As described above, in the case that the TSTB unit 311 sends the TID assignment request ACK message to the TDMA unit 303, when the message includes the temporary TID generated by the local unit, and the TDMA unit 303 sends the TID assignment success message to the TSTB unit 311 corresponding to the TID assignment request ACK message, the TDMA unit 303 sends the TID assignment success message including the temporary TID of the received TID assignment request ACK message. Thus, normally, the temporary TID of the received TID assignment success message accords with the temporary TID generated by the TSTB unit 311. However, as described above, when the TDMA unit 303 successively receives a plurality of TID assignment request ACK messages, the TDMA unit 303 may process only a message that has been received first as a valid message. In this case, the TID assignment request ACK message sent to the TDMA unit 303 by the TSTB unit 311 that has received the TID assignment success message may not be processed by the TDMA unit 303. In the determining process, such a situation is checked. With the determining process, terminal IDs can be prevented from being duplicated. In addition, the terminal ID automatic assigning process can be continued for one TID assignment request ACK message.

When the TDMA unit 303 has successively received a plurality of TID assignment request ACK messages, the TDMA unit 303 can send a TID assignment unsuccess message (that will be described later) instead of executing step 1708 shown in FIG. 17. In this case, the TSTB unit 311 does not need to execute the above-described determining process.

When the CPU 707 has determined that the temporary TID of the received TID assignment success message accords with the temporary TID generated by the local unit, the CPU 707 sends the TID assignment success ACK message including the temporary TID generated by the local unit and the permanent TID stored in the register or the like to the up transmission line 317 (at step 1810 shown in FIG. 18 and at steps 1909 and 1910 shown in FIG. 19). The permanent TID is stored in a register or the like of the CPU 707 when the CPU 707 receives the TID assignment request message (see the description of step 1806 shown in FIG. 18).

The TID assignment success ACK message is sent with the M channel (see FIGS. 10 and 11(1)) of the up transmission line 317 through the frame terminating unit 702 (see FIG. 7).

In this case, as shown in FIGS. 13(c) and 14(c), a temporary TID ("2000" to "3FEF") generated by the CPU 707 is stored in the header portion of the M channel data. As shown in FIG. 16(e), as a command of the data portion, a code "12" (Hex) that represents the TID assignment success message is stored. As a parameter of the data portion, a value ("0001" to "1FFF" (Hex)) of 13 bits that represents the permanent TID, is stored.

In addition, the CPU 707 registers the permanent TID as the terminal ID of the local unit to the non-volatile memory 708 (at step 1811 shown in FIG. 18 and at step 1909 shown in FIG. 19).

After the CPU 423 of the TDMA unit 303 has sent the TID assignment success message to the down transmission line 317 (at step 1709 shown in FIG. 17), the CPU 423 monitors whether or not the TID assignment success ACK message has been received from the transmission line 317 in a predetermined time period (at step 1710 shown in FIG. 17). The message is received in the M channel (see FIGS. 10 and 11(1)) of the up transmission line 317 through the deframing unit 421 of the TSTB interface unit (up) 404 (see FIG. 4).

When the CPU 423 has received the TID assignment success ACK message from the up transmission line 317, the CPU 423 determines that the permanent TID of the TID assignment request message has been successfully assigned and stores the ID as the assigned terminal ID to the RAM 425 (see FIG. 4) (at step 1711 shown in FIG. 17 and at step 1911 shown in FIG. 19).

In the above-described sequence, since the TDMA unit 303 primarily sends the TID assignment request message, the TDMA unit 303 can monitor whether or not TID assignment request ACK messages of the TSTB units 311 contend. Thus, the TDMA unit 303 can properly perform the terminal ID automatic assigning process.

In the above-described sequence, with the temporary TID randomly generated by the TSTB unit 311, the TID assignment request ACK message, the terminal ID assignment success message, the TID assignment success ACK message or the like is communicated between the TDMA unit 303 and the TSTB units 311. Thus, the TDMA unit 303 can properly execute the contention protecting process for protecting the terminal ID automatic assigning process for a plurality of TSTB units 311 (subscriber units 303) from contending.

In the above-described sequence, when the TDMA unit 303 has detected that the TID assignment request ACK messages received from a plurality of TSTB units 311 have contended (a CRC error has taken place or a plurality of messages have been received), the TDMA unit 303 sends TID assignment unsuccess messages to TSTB units 311 so as to cause each TSTB unit 311 to stop the terminal ID automatic assigning process. Thus, terminal IDs can be prevented from being duplicated.

In the above-described sequence, since the TDMA unit 303 sends the TID assignment request message with the M channel of the down transmission line at intervals of the predetermined time period, the TDMA unit 303 can send and receive control signals of the normality checking process, the carrier level adjusting process, the distance information adjusting process, and so forth for the TSTB units 311 using the M channel while the TDMA unit 303 is not sending the TID assignment request message. Thus, the M channel can be effectively used.

<Unsuccessful sequence 1>

Next, with reference to the operational flowcharts shown in FIGS. 17 and 18, an unsuccessful sequence 1 of the terminal ID automatic assigning process will be described corresponding to a sequence chart shown in FIG. 20.

As with the normal sequence described with reference to FIG. 19, the TDMA unit 303 sends a TID assignment request message to the down transmission line 317 at intervals of a predetermined time period (at step 1904 shown in FIG. 20, this step is the same as that shown in FIG. 19). The TSTB unit 311 sends a TID assignment request ACK message as an acknowledgment of the TID assignment request message to the TDMA unit 303 (at steps 1905 and 1906 shown in FIG. 20, these steps are the same as those shown in FIG. 19).

As described above, the CPU 423 of the TDMA unit 303 receives the TID assignment request ACK message from the up transmission line 317 (in a loop from step 1704 to step 1705 shown in FIG. 17). The CPU 423 checks for a CRC of the message so as to determine whether or not a transmission error has taken place (at step 1705 shown in FIG. 17 and at step 2001 shown in FIG. 20). As described above, when a plurality of TSTB units 311 acknowledge one TID assignment request message that the TDMA unit 303 has sent to the down transmission line 317 and the TSTB units 311 send respective TID assignment request ACK messages to the up transmission line 317 at the same time, frames contend on the up transmission line 317, resulting in a transmission error.

Figure 20:
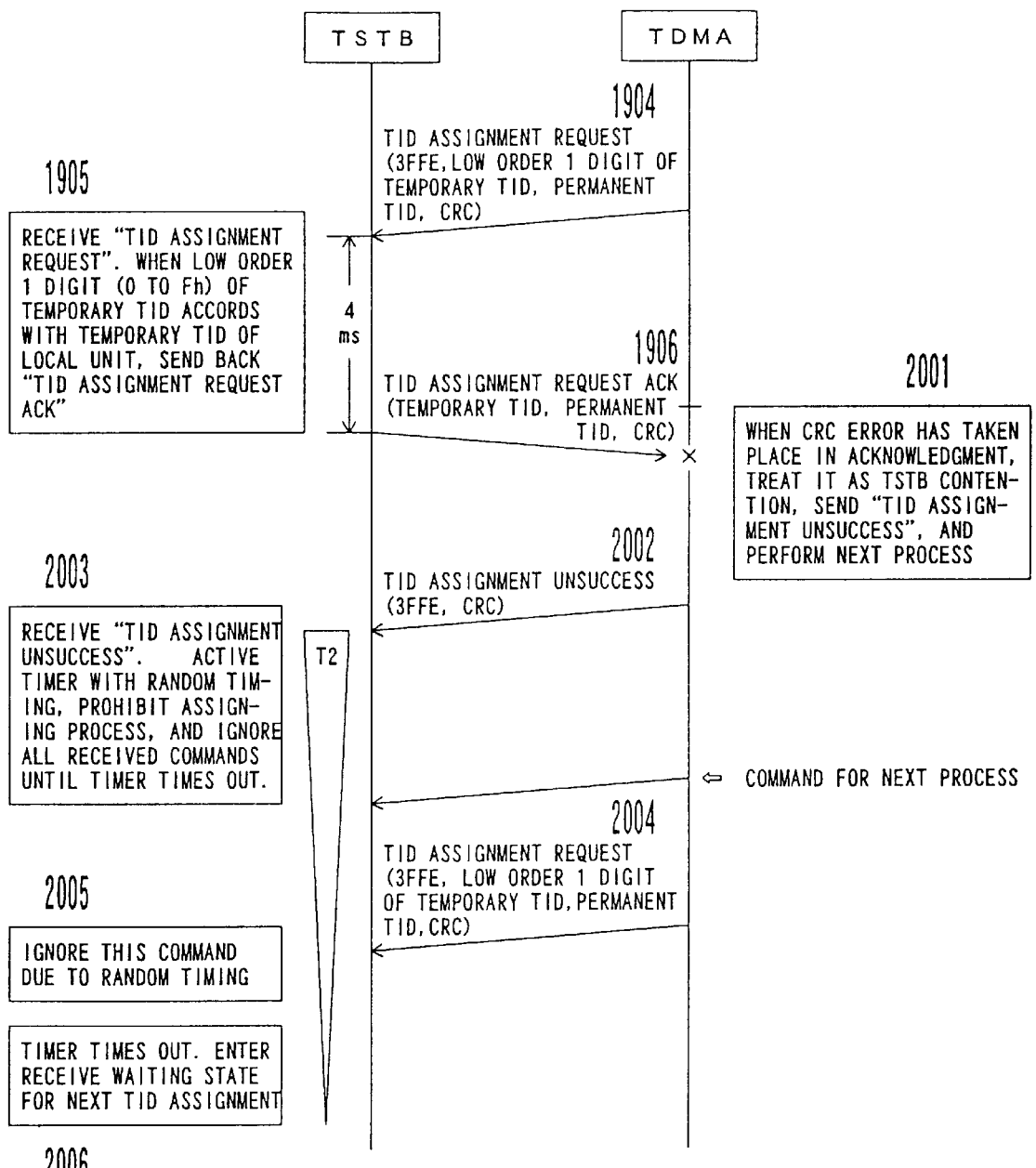
FIG. 20 is a sequence chart showing an example of the sequence of the terminal ID automatic assigning process (unsuccessful sequence 1)

When the CPU 423 has detected a CRC error, the CPU 423 sends a TID interrupt unsuccess message to the down transmission line 317 (at step 1706 shown in FIG. 17 and at steps 2001 and 2002 shown in FIG. 20).

The TID assignment unsuccess message is sent in the M channel (see FIGS. 10 and 12(2)) of the down transmission line 317 through the framing unit 416 of the TSTB interface unit (down) 403 (see FIG. 4).

In this case, as shown in FIG. 13(b) and 14(b), a code "3FFE" that represents that the M channel data is a terminal ID automatic assignment global message is stored in the header portion of the M channel data. In addition, as shown in FIG. 16(f), as a command of the data portion, a code "13" (Hex) that represents that the TID has not been successfully assigned is stored. As a parameter of the data portion, a value (I="0" to "F" (Hex)) of four bits that represents the low order one digit of the temporary ID is stored.

On the other hand, as described above, after the CPU 707 of the TSTB unit 311 has sent a TID assignment request ACK message to the up transmission line 317, it monitors whether or not a TID assignment unsuccess message or a TID assignment success message has been received from the down transmission line 317 in a predetermined time period (at steps 1807 and 1808 shown in FIG. 18).

When the CPU 707 has received the TID assignment unsuccess message in the predetermined time period, the CPU 707 determines that the TID assignment request ACK message sent by the local unit to the up transmission line 317 contends with a TID assignment request ACK message that has been sent at the same time by another TSTB unit 311 to the up transmission line 317. To prevent the contention of the next retry operation, the CPU 707 activates the timer with a random timing so as to prohibit all messages such as the TID assignment request message from being received from the down transmission line 317 until the timer times out (in a loop from step 1812 to step 1813 shown in FIG. 18 and at steps 2004 and 2005 shown in FIG. 20). Since the timer process is performed by all TSTB units (subscriber units 302) that cause frames to contend, the TSTB units 311 prevent TID assignment request ACK messages during being sent at the same timing in their retry operations.

When the timer has timed out, the CPU 707 enters the receive waiting state for the next TID assignment request message (in a loop from step 1813 to step 1803 shown in FIG. 18 and at step 2006 shown in FIG. 20).

<Unsuccessful sequence 2>

Next, with reference to operational flowcharts shown in FIGS. 17 and 18, an unsuccessful sequence 2 of the terminal ID automatic assigning process will be described corresponding to a sequence chart shown in FIG. 21.

Figure 21:
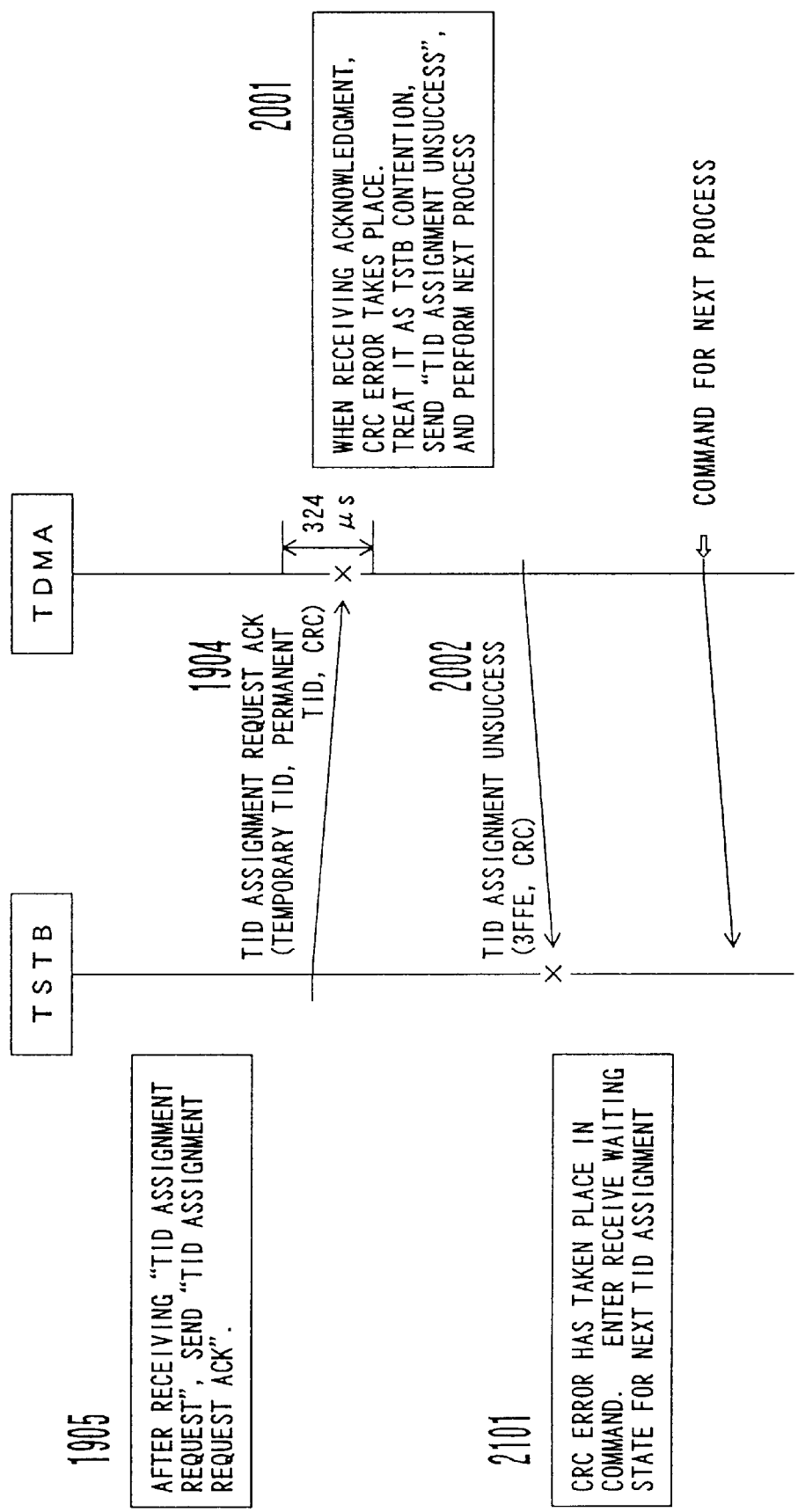
FIG. 21 is a sequence chart showing an example of the sequence of the terminal ID automatic assigning process (unsuccessful sequence 2)

As with the case of the above-described unsuccessful sequence 1, when the CPU 423 of the TDMA unit 303 detects a CRC error, the CPU 423 sends a TID assignment unsuccess message to the down transmission line 317 (at step 1706 shown in FIG. 17 and at steps 2001 and 2002 shown in FIG. 21, these steps are the same as those shown in FIG. 20). On the other hand, after the CPU 707 of the TSTB unit 311 has sent a TID assignment request ACK message to the up transmission line 317, the CPU 707 may receive neither a TID assignment success message, nor a TID assignment unsuccess message due to a CRC error in a predetermined time period from the down transmission line 317.

In this case, the CPU 707 of the TSTB unit 311 enters the receive waiting state for the next TID assignment request message (in a loop from step 1808 to step 1803 shown in FIG. 18 and at step 2101 shown in FIG. 21).

<Unsuccessful sequence 3>

Next, with reference to operational flowcharts shown in FIGS. 17 and 18, an unsuccessful sequence 3 of the terminal ID automatic assigning process will be described corresponding to a sequence chart shown in FIG. 22.

As with the case of the normal sequence described with reference to FIG. 19, the TDMA unit 303 sends a TID assignment request message to the down transmission line 317 at intervals of a predetermined time period (at step 1904 shown in FIG. 22, this step is the same as that shown in FIG. 19). Thereafter, the TSTB unit 311 sends a TID assignment request ACK message to the TDMA unit 303 (at steps 1905 and 1906 shown in FIG. 22, these steps are the same as those shown in FIG. 19). Next, the TDMA unit 303 sends a TID assignment success message to the TSTB unit 311 (at steps 1907 and 1908 shown in FIG. 22, these steps are the same as those shown in FIG. 19).

On the other hand, as described above, after the CPU 707 of the TSTB unit 311 has sent the TID assignment request ACK message to the up transmission line 317, the CPU 707 monitors whether or not a TID assignment success message or a TID assignment success message has been received from the down transmission line 317 in a predetermined time period (at steps 1807 and 1808 shown in FIG. 18).

Figure 22:
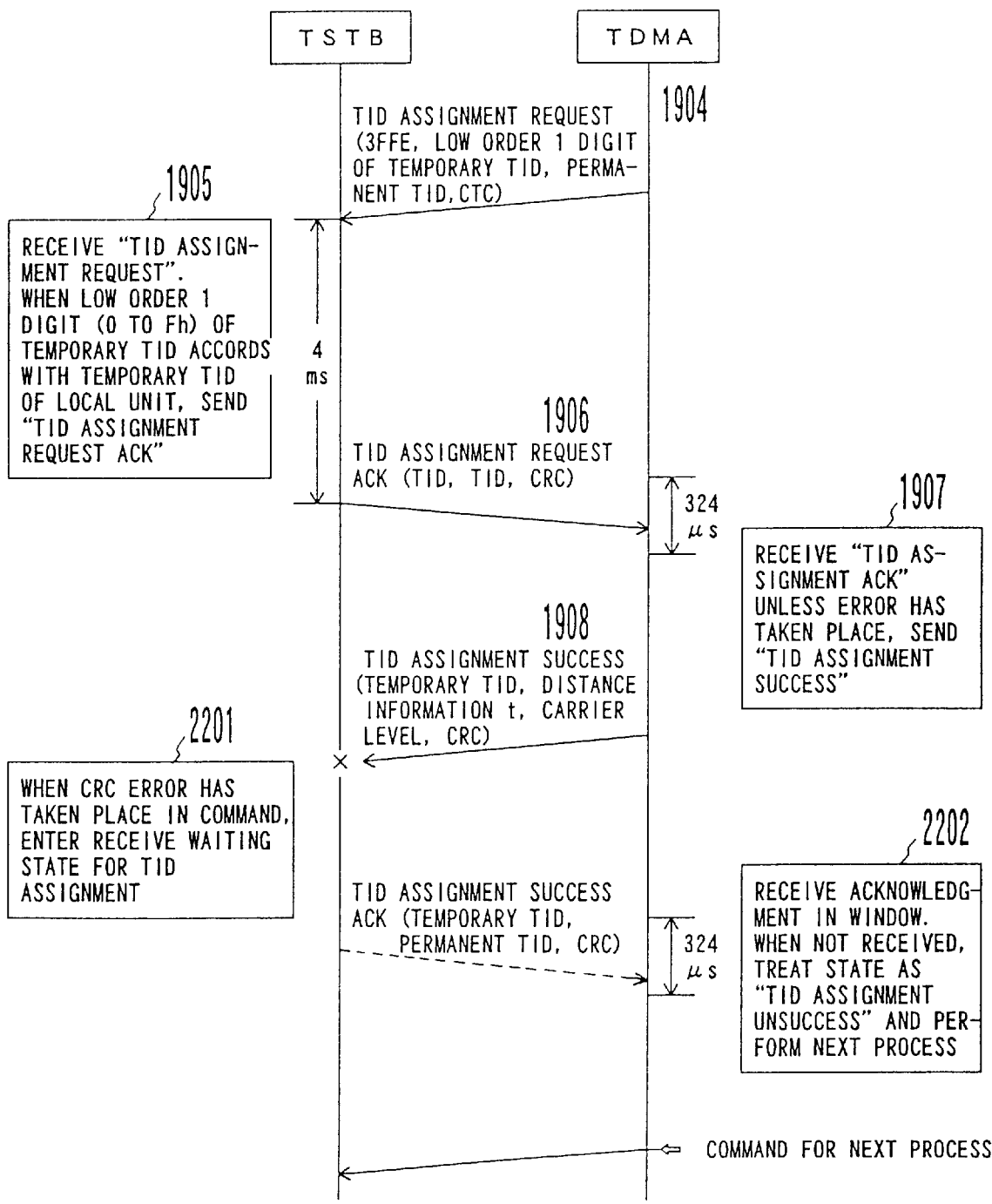
FIG. 22 is a sequence chart showing an example of the sequence of the terminal ID automatic assigning process (unsuccessful sequence 3)

When the CPU 707 has received neither the TID assignment unsuccess message, nor the TID assignment success message in the predetermined time period due to a CRC error, the CPU 707 enters the receive waiting state for the next TID assignment request message (in a loop from step 1808 to step 1803 shown in FIG. 18 and at step 2201 shown in FIG. 22).

In this case, the TSTB unit 311 does not send the TID assignment success ACK message to the TDMA unit 303.

After the CPU 423 of the TDMA unit 303 has sent the TID assignment success message to the down transmission line 317 (at step 1709 shown in FIG. 17), the CPU 423 monitors whether or not the TID assignment success ACK message has been received from the up transmission line 317 in the predetermined time period (at step 1710 shown in FIG. 17). In such a case, the CPU 423 cannot receive the TID assignment success ACK message from the up transmission line 317.

In this case, the CPU 423 tries to resend the TID assignment success message a predetermined number of times (in a loop from step 1710 to step 1712 to step 1709 to step 1710 shown in FIG. 17). When the CPU 423 has failed to resend the TID assignment success message the predetermined number of times, the CPU 423 determines that the terminal ID automatic assigning process has not been successfully performed and returns to the resending process for the TID assignment request message (in a loop from step 1712 to step 1713 to step 1701 shown in FIG. 17 and at step 2202 shown in FIG. 22).

<Unsuccessful sequence 4>

Figure 23:
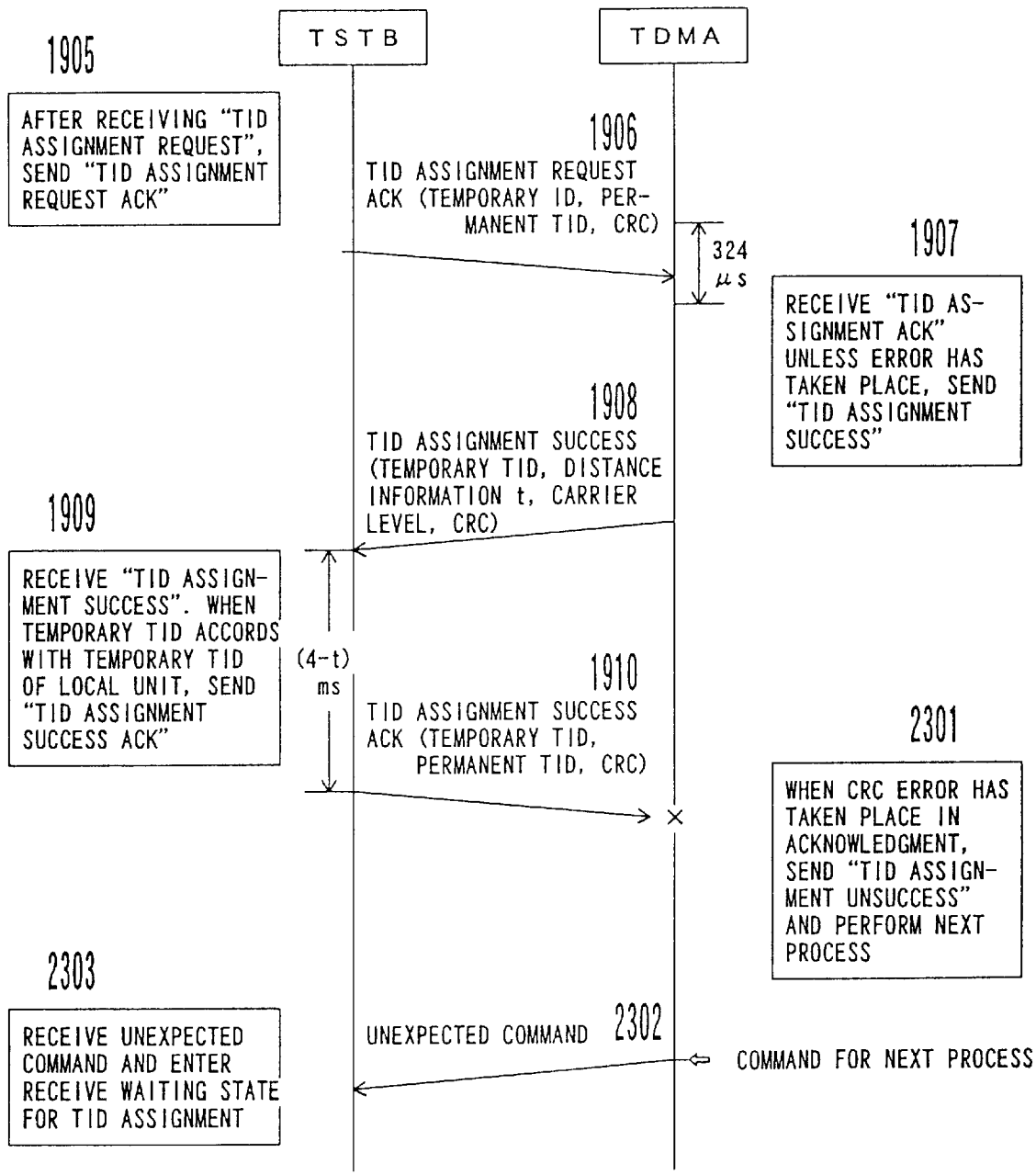
FIG. 23 is a sequence chart showing an example of the sequence of the terminal ID automatic assigning process (unsuccessful sequence 4)

Next, with reference to operational flowcharts shown in FIGS. 17 and 18, an unsuccessful sequence 4 of the terminal ID automatic assigning process will be described corresponding to a sequence chart shown in FIG. 23.

As with the case of the normal sequence described with reference to FIG. 19, the TDMA unit 303 sends a TID assignment request message to the down transmission line at intervals of a predetermined time period. Thereafter, a TSTB unit 311 sends a TID assignment request ACK message to the TDMA unit 303 (at steps 1905 and 1906 shown in FIG. 23, these steps are the same as those shown in FIG. 19). Next, the TDMA unit 303 sends a TID assignment success message to the TSTB unit 311 (at steps 1907 and 1908 shown in FIG. 23, these steps are the same as those shown in FIG. 19). Then, the TSTB unit 311 sends a TID assignment success ACK message to the TDMA unit 303 (at steps 1909 and 1910 shown in FIG. 23, these steps are the same as those shown in FIG. 19).

After the CPU 423 of the TDMA unit 303 has sent the TID assignment success message to the down transmission line 317 (at step 1709 shown in FIG. 17), the CPU 423 monitors whether or not the TID assignment success ACK message has been received from the up transmission line 317 in a predetermined time period (at step 1710 shown in FIG. 17). When a CRC error has taken place in the TID assignment success ACK message, the CPU 423 cannot receive the TID assignment success ACK message from the up transmission line 317.

In this case, the CPU 423 tries to resend the TID assignment success message a predetermined number of times (in a loop from step 1710 to step 1712 to step 1709 to step 1710 shown in FIG. 17). On the other hand, the CPU 707 of the TSTB unit 311 receives an unexpected TID assignment success message. In this case, the CPU 707 enters the receive waiting state for the next TID assignment request message (at steps 2302 and 2303 shown in FIG. 23). Thus, the CPU 423 of the TDMA unit 303 fails to resend the message the predetermined number of times. Consequently, the CPU 423 determines that the terminal ID automatic assigning process has not been successfully performed and returns to a resending process for the TID assignment request message (in a loop from step 1712 to step 1713 to step 1701 shown in FIG. 17 and at step 2301 shown in FIG. 23).

<Unsuccessful sequence 5>

Next, an unsuccessful sequence 5 (not shown) will be described.

As with the case of the normal sequence described with reference to FIG. 19, the TDMA unit 303 sends a TID assignment request message to the down transmission line 317 at intervals of a predetermined time period. Thereafter, the TSTB unit 311 sends a TID assignment request ACK message to the TDMA unit 303. Next, the TDMA unit 303 sends a TID assignment success message to the TSTB unit 311.

When the CPU 707 of the TSTB unit 311 receives the TID assignment success message in a predetermined time period, the CPU 707 determines whether or not the temporary TID of the message accords with the temporary TID (at step 1802 shown in FIG. 18) generated by the local unit (at step 1809 shown in FIG. 18 and at step 1909 shown in FIG. 19). As described above, the TDMA unit 303 treats only a message that has been received first as a valid message (at step 1708 shown in FIG. 17). Thus, when the CPU 707 has determined that the temporary TID of the received TID assignment success message dose not accord with the temporary TID generated by the local unit, the CPU 707 executes the same process as the above-described unsuccessful sequence 1 (in a loop from step 1809 to step 1812 shown in FIG. 18).

<Description of another preferred embodiment>

In the above-described preferred embodiment, an analog telephone set can be connected to the TSTB unit 311. In this case, an assigned terminal ID should be correlated with a telephone number.

Figure 24:
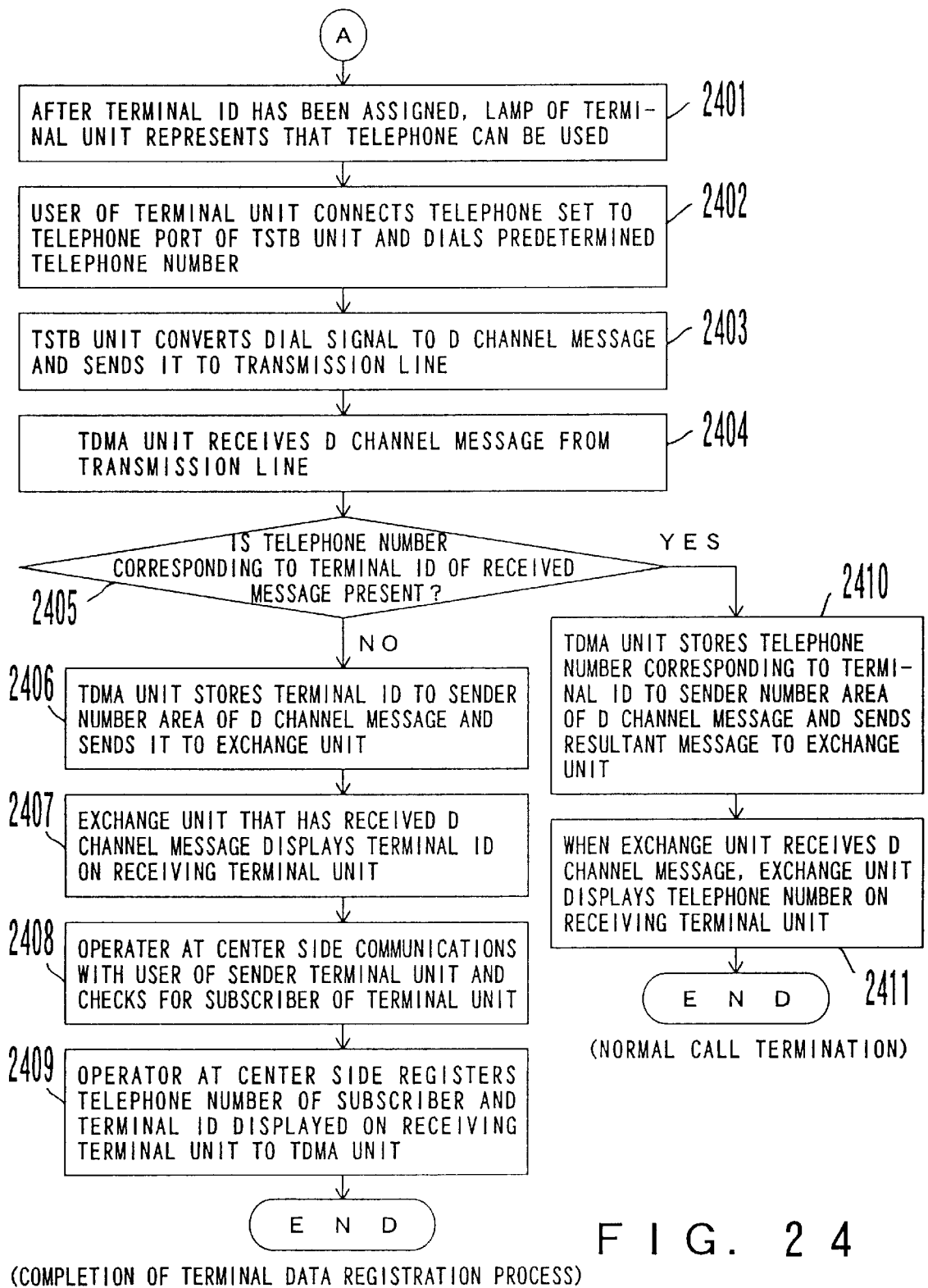
FIG. 24 is a flowchart showing an operation of another preferred embodiment of the present invention.

However, a different telephone number will have been assigned to each subscriber. Thus, it is difficult to automatically assign a telephone number when a terminal ID is automatically assigned. Thus, while a subscriber is being identified, a terminal ID and a telephone number should be correlated. FIG. 24 is a flowchart showing such a correlating process.

After a terminal ID has been automatically assigned, a lamp of the display unit 706 of the TSTB unit 311 (see FIG. 7) lights. Thus, the user of the TSTB unit 311 knows that an analog telephone set can be connected to the TSTB unit 311 (at step 2401 shown in FIG. 24).

Thereafter, the user of the TSTB unit 311 (subscriber unit 302) connects the analog telephone set to the analog telephone port of the TSTB unit 311 and dials a predetermined telephone number of the center unit (at step 2402 shown in FIG. 24).

The CPU 707 of the TSTB unit 311 converts a dial signal of the analog telephone set to a D channel message and sends the message to the up transmission line 317 through the frame terminating unit 702 (at step 2403 shown in FIG. 24).

The CPU 423 of the TDMA unit 303 receives the D channel message from the up transmission line 317 through the deframing unit 421 of the TSTB interface unit (up) 404 (at step 2404 shown in FIG. 24).

The CPU 423 determines whether or not the telephone number corresponding to the terminal ID of the received D channel message has been assigned (at step 2405 shown in FIG. 24).

When the CPU 423 has determined that the telephone number corresponding to the terminal ID of the received D channel message has not been assigned, the CPU 423 stores the terminal ID to the sender number area of the D channel message and sends the message to the exchange node 304 (at step 2406 shown in FIG. 24).

When the exchange node 304 has received the D channel message, it displays the terminal ID on a receiving terminal unit corresponding to a predetermined number (at step 2407 shown in FIG. 24).

The operator of the center unit communicates with the user of the sender terminal unit (TSTB unit 311) and identifies the user of the installed terminal unit (at step 2408 shown in FIG. 24).

The operator of the center unit stores the telephone number corresponding to the subscriber and the terminal ID displayed on the receiving terminal unit in the RAM 425 (see FIG. 4) or the like, of the TDMA unit 303.

Thus, without need to use a special unit connected or added to the TSTB unit 311, when the user of the TSTB unit 311 simply calls a predetermined telephone number from an analog telephone set connected to the TSTB unit 311, the terminal ID and the telephone number corresponding thereto can be registered.

Thereafter, when the D channel message is sent from the TSTB unit 311 to the center unit so as to call the center unit, the determined result at step 2405 shown in FIG. 24 becomes Yes. Next, the CPU 423 of the TDMA unit 303 stores a telephone number corresponding to the terminal ID to the sender number area of the received D channel message and sends the message to the exchange node 304.

When the exchange node 304 receives the D channel message, the exchange node 304 executes a predetermined exchanging process and displays the telephone number on the receiving terminal unit.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A terminal ID assigning method for automatically assigning terminal IDs that are identifiers for uniquely identifying a plurality of terminal units in a network, at the initiative of a center unit, under the control of a communication system where the center unit and a plurality of the terminal units bidirectionally communicate through the network having a "1" to "n" connection function, comprising the steps of:

causing the center unit to send a terminal ID assignment request message for requesting an assignment of the terminal ID through a predetermined control channel in the network, before being requested from the terminal units, causing the terminal unit that has not been assigned the terminal ID to send a terminal ID assignment request acknowledgement message corresponding to the received terminal ID assignment request message through the predetermined control channel in the network when the terminal unit receives the terminal ID assignment request message through the predetermined control channel in the network; and causing the center unit to receive the terminal ID assignment request acknowledgement message through the predetermined control channel in the network, exchange messages with the terminal unit that has sent the terminal ID assignment request acknowledgement message, and assign the terminal ID to the terminal unit.

2. A terminal ID assigning method for automatically assigning terminal Ids that are identifiers for uniquely identifying a plurality of terminal units in a network, under the control of a communication system where a center unit and a plurality of the terminal units bidirectionally communicate through the network having a "1" to "n" connection function, comprising the steps of:

causing the center unit to send a terminal ID assignment request message for requesting an assignment of the terminal ID through a predetermined control channel in the network, causing the terminal unit that has not been assigned the terminal ID to send a terminal ID assignment request acknowledgement message corresponding to the received terminal ID assignment request message through the predetermined control channel in the network when the terminal unit receives the terminal ID assignment request message through the predetermined control channel in the network; and causing the center unit to receive the terminal ID assignment request acknowledgement message through the predetermined control channel in the network, exchange messages with the terminal unit that has sent the terminal ID assignment request acknowledgement message, and assign the terminal ID to the terminal unit;

wherein the center unit adds terminal unit selection data with a predetermined number of digits and whose value cyclically varies to the terminal ID assignment request message when the center unit sends the terminal ID assignment request message, wherein the terminal unit that has not been assigned the terminal ID randomly generates a temporary terminal ID that is an identifier for identifying the terminal unit when the terminal ID is automatically assigned, and wherein the terminal unit that has not been assigned the terminal ID sends the terminal ID assignment request acknowledgement message when the terminal unit selection data of the received terminal ID assignment request message accords with data of the predetermined number of low order digits of the temporary terminal ID.

3. The method as set forth in claim 1, wherein the center unit sends a terminal ID assignment success message that represents that the terminal ID has been successfully assigned through the predetermined control channel in the network when the center unit has received the terminal ID assignment request acknowledgment message through the predetermined control channel in the network, wherein the center unit sends the terminal ID assignment unsuccess message that represents that the terminal ID has not been successfully assigned through the predetermined control channel in the network when the center unit has detected a data error of the terminal ID assignment request acknowledgment message received through the predetermined control channel in the network or when the center unit has successively received a plurality of the terminal ID assignment request acknowledgment messages through the predetermined control channel in the network, wherein the terminal unit that has not been assigned the terminal ID registers a permanent terminal ID received from the center unit as the terminal ID of the terminal unit when the terminal unit has received the terminal ID assignment success message through the predetermined control channel in the network, and wherein the terminal unit that has not been assigned the terminal ID executes a process for the case that the terminal ID automatic assigning process has not been successfully performed when the terminal unit has received the terminal ID assignment unsuccess message through the predetermined control channel in the network.

4. A terminal ID assigning method for automatically assigning terminal Ids that are identifiers for uniquely identifying a plurality of terminal units in a network, under the control of a communication system where a center unit and a plurality of the terminal units bidirectionally communicate through the network having a "1" to "n" connection function, comprising the steps of:

causing the center unit to send a terminal ID assignment request message for requesting an assignment of the terminal ID through a predetermined control channel in the network, causing the terminal unit that has not been assigned the terminal ID to send a terminal ID assignment request acknowledgement message corresponding to the received terminal ID assignment request message through the predetermined control channel in the network when the terminal unit receives the terminal ID assignment request message through the predetermined control channel in the network; and causing the center unit to receive the terminal ID assignment request acknowledgement message through the predetermined control channel in the network; exchange messages with the terminal unit that has sent the terminal ID assignment request acknowledgement message, and assign the terminal ID to the terminal unit;

wherein the center unit sends a terminal ID assignment success message that represents that the terminal ID has been successfully assigned through the predetermined control channel in the network when the center unit has received the terminal ID assignment request acknowledgement message through the predetermined control channel in the network, wherein the center unit sends the terminal ID assignment unsuccess message that represents that the terminal ID has not been successively assigned through the predetermined control channel in the network when the center unit has detected a data error of the terminal ID assignment request acknowledgement message received through the predetermined control channel in the network or when the center unit has successively received a plurality of the terminal ID assignment request acknowledgement messages through the predetermined control channel in the network, wherein the terminal unit that has not been assigned the terminal ID registers a permanent terminal ID received from the center unit as the terminal ID of the terminal unit when the terminal unit has received the terminal ID assignment success message through the predetermined control channel in the network, wherein the terminal unit that has not been assigned the terminal ID executes a process for the case that the terminal ID automatic assigning process has not been successfully performed when the terminal unit has received the terminal ID assignment unsuccess message through the predetermined control channel in the network, and wherein the terminal unit that has not been assigned the terminal ID activates a timer with a random timing when the terminal unit has received the terminal ID assignment unsuccess message through the predetermined control channel in the network, prohibits any message from being received through the predetermined control channel in the network until the timer times out, and enters a receive waiting state for the terminal ID assignment request message after the timer times out.

5. The method as set forth in claim 1, wherein the center unit sends the terminal ID assignment request message for requesting an assignment of the terminal ID at intervals of a predetermined time period through the predetermined control channel in the network, and wherein the center unit shares the predetermined control channel in the network with the terminal ID assignment request message and other control signals while the center unit is not sending the terminal ID assignment request message.

6. The method as set forth in claim 1, wherein a predetermined terminal unit the center unit maintains displays the terminal ID of the terminal unit of which the automatic terminal ID assigning process has been completed when the terminal unit calls the predetermined terminal unit.

7. A terminal ID assigning method for automatically assigning terminal Ids that are identifiers for uniquely identifying a plurality of terminal units in a network, at the initiative of a center unit, under the control of a communication system where the center unit and a plurality of the terminal units bidirectionally communicate through the network having a "1" to "n" connecting function, comprising the steps of:

causing the center unit to send a terminal ID assignment request message for requesting an assignment of the terminal ID through a predetermined control channel in the network, before being requested from the terminal units;

causing the terminal unit that has not been assigned the terminal ID to randomly generate a temporary terminal ID that is an identifier for identifying the terminal unit when the terminal ID is automatically assigned;

causing the terminal unit to send a terminal ID assignment request acknowledgement message that is an acknowledgement of the received terminal ID assignment request message and that has the temporary terminal ID generated by the terminal unit through the predetermined control channel in the network when the terminal unit has received the terminal ID assignment request message through the predetermined control channel in the network; and causing the center unit to receive the terminal ID assignment request acknowledgement message through the predetermined control channel in the network, identify the temporary terminal ID in the terminal ID assignment request acknowledgement message, exchange messages with the terminal unit corresponding to the temporary terminal ID, and assign the terminal ID to the terminal unit corresponding to the temporary terminal ID.

8. The method as set forth in claim 7, wherein the center unit adds terminal unit selection data with a predetermined number of digits and whose value cyclically varies to the terminal ID assignment request message when the center unit sends the terminal ID assignment request message, wherein the terminal unit that has not been assigned the terminal ID randomly generates a temporary terminal ID that is an identifier for identifying the terminal unit when the terminal ID is automatically assigned, and wherein the terminal unit that has not been assigned the terminal ID sends the terminal ID assignment request acknowledgment message when the terminal unit selection data of the received terminal ID assignment request message accords with data of the predetermined number of low order digits of the temporary terminal ID.

9. The method as set forth in claim 7, wherein the center unit sends a terminal ID assignment success message that represents that the terminal ID has been successfully assigned through the predetermined control channel in the network when the center unit has received the terminal ID assignment request acknowledgment message through the predetermined control channel in the network, wherein the center unit sends a terminal ID assignment unsuccess message that represents that the terminal ID has not been successfully assigned through the predetermined control channel in the network when the center unit has detected a data error of the terminal ID assignment request acknowledgment message received through the predetermined control channel in the network or when the center unit has successively received a plurality of the terminal ID assignment request acknowledgment messages through the predetermined control channel in the network, wherein the terminal unit that has not been assigned the terminal ID registers a permanent terminal ID received from the center unit as the terminal ID of the terminal unit when the terminal unit has received the terminal ID assignment success message through the predetermined control channel in the network, and wherein the terminal unit that has not been assigned the terminal ID executes a process for the case that the terminal ID automatic assigning process has not been successfully performed when the terminal unit has received the terminal ID assignment unsuccess message through the predetermined control channel in the network.

10. The method as set forth in claim 9, wherein the terminal unit that has not been assigned the terminal ID activates a timer with a random timing when the terminal unit has received the terminal ID assignment unsuccess message through the predetermined control channel in the network, prohibits any message from being received through the predetermined control channel in the network until the timer times out, and enters a receive waiting state for the terminal ID assignment request message after the timer times out.

11. The method as set forth in claim 7, wherein the center unit sends the terminal ID assignment request message for requesting an assignment of the terminal ID at intervals of a predetermined time period through the predetermined control channel in the network, and wherein the center unit shares the predetermined control channel in the network with the terminal ID assignment request message and other control signals while the center unit is not sending the terminal ID assignment request message.

12. The method as set forth in claim 7,
wherein a predetermined terminal unit the center unit maintains displays the terminal ID of the terminal unit of which the automatic terminal ID assigning process has been completed when the terminal unit calls the predetermined terminal unit.

13. The method as set forth in claim 7,
wherein the center unit sends a terminal ID assignment request acknowledgment message that represents that the terminal ID has been successfully assigned and that has the temporary terminal ID added to the received terminal ID assignment request acknowledgment message through the predetermined control channel in the network when the center unit receives said one terminal ID assignment request acknowledgment message through the predetermined control channel in the network,
wherein the center unit sends a terminal ID assignment success message that represents that the terminal ID has been successfully assigned and that has the temporary terminal ID added to one of a plurality of the received terminal ID assignment request acknowledgment messages selected corresponding to a predetermined rule when the center unit successively receives a plurality of the terminal ID assignment request acknowledgment messages through the predetermined control channel in the network,
wherein the center unit sends a terminal ID assignment unsuccess message that represents that the terminal ID has not been successfully assigned through the predetermined control channel in the network when the center unit has detected a data error in the received terminal ID assignment acknowledgment message,
wherein the terminal unit that has not been assigned the terminal ID registers a permanent terminal ID received from the center unit as the terminal ID of the terminal unit when the terminal unit has received the terminal ID assignment success message through the predetermined control channel in the network and the temporary terminal ID added to the received terminal ID assignment success message accords with the temporary terminal ID generated by the terminal unit, and
wherein the terminal unit that has not been assigned the terminal ID executes a process for the case that the terminal ID automatic assigning process has not been successfully performed when the terminal unit has received the terminal ID assignment unsuccess message through the predetermined control channel in the network or when the terminal unit has received the terminal ID assignment success message through the predetermined control channel in the network and the temporary terminal ID added to the received terminal ID assignment success message does not accord with the temporary terminal ID generated by the terminal unit.

14. The method as set forth in claim 13,
wherein the terminal unit that has not been assigned the terminal ID activates a timer with a random timing when the terminal unit has received the terminal ID assignment unsuccess message through the predetermined control channel in the network or when the terminal unit has received the terminal ID assignment success message through the predetermined control channel in the network and the temporary terminal ID added to the received terminal ID assignment success message does not accord with the temporary terminal ID generated by the terminal unit, prohibits any message from being received through the predetermined control channel in the network until the timer times out, and enters the receive waiting state for the terminal ID assignment request message after the timer times out.

15. A terminal ID assigning system for automatically assigning terminal IDs that are identifiers for uniquely identifying a plurality of terminal units in a network, at the initiative of a center unit, under the control of a communication system where the center unit and a plurality of the terminal units bidirectionally communicate through the network having a "1" to "n" connecting function,
wherein the center unit comprises:
terminal ID assignment request message sending means for sending a terminal ID assignment request message for requesting an assignment of the terminal ID through the predetermined control channel in the network, before being requested from the terminal units;
terminal ID assignment request acknowledgement message receiving means for receiving the terminal ID assignment request acknowledgement message through the predetermined control channel in the network; and
terminal ID assigning means for assigning the terminal ID corresponding to the terminal unit by exchanging a message with the terminal unit that has sent the terminal ID assignment request acknowledgement message, and
wherein each of the terminal units comprises:
terminal ID assignment request message receiving means for receiving the terminal ID assignment request message through the predetermined control channel in the network when the terminal unit has not been assigned the terminal ID; and
terminal ID assignment acknowledgement message sending means for sending a terminal ID assignment request acknowledgement message corresponding to the received terminal ID assignment request message through the predetermined control channel in the network.

16. A center unit in a terminal ID assigning system for automatically assigning terminal Ids that are identifiers for uniquely identifying a plurality of terminal units in a network, at the initiative of the center unit, under the control of a communication system where the center unit and a plurality of the terminal units bidirectionally communication through the network having a "1" to "n" connecting function, comprising:
terminal ID assignment request message sending means for sending a terminal ID assignment request message for requesting an assignment of the terminal ID through a predetermined control channel in the network, before being requested from the terminal units;
terminal ID assignment request acknowledgement message receiving means for receiving a terminal ID assignment request acknowledgement message through the predetermined control channel in the network; and
terminal ID assigning means for assigning the terminal ID corresponding to the terminal unit by exchanging a message with the terminal unit that has sent the terminal ID assignment request acknowledgement message.

17. A terminal unit in a terminal ID assigning system for automatically assigning terminal IDs that are identifiers for uniquely identifying a plurality of terminal units in a network, at the initiative of the center unit, under the control of a communication system where the center unit and a plurality of the terminal units bidirectionally communicate through the network having a "1" to "n" connecting function, comprising:

terminal ID assignment request message receiving means for receiving a terminal ID assignment request message through a predetermined control channel in the network when the terminal unit has not been assigned the terminal ID, before being requested from the terminal units; and terminal ID assignment request acknowledgement message sending means for sending a terminal ID assignment request acknowledgement message corresponding to the received terminal ID assignment request message through the received terminal ID assignment request message.

18. A terminal ID assigning system for automatically assigning terminal IDs that are identifiers for uniquely identifying a plurality of terminal units in a network, at the initiative of a center unit, under the control of a communication system where the center unit and a plurality of the terminal units bidirectionally communicate through the network having a "1" to "n" connecting function, wherein the center unit comprises:

terminal ID assignment request message sending means for sending a terminal ID assignment request message for requesting an assignment of the terminal ID through the predetermined control channel in the network, before being requested from the terminal units;

terminal ID assignment request acknowledgement message receiving means for receiving the terminal ID assignment request acknowledgement message through the predetermined control channel in the network; and terminal ID assigning means for identifying a temporary terminal ID added to the received terminal ID assignment request acknowledgement message, exchanging messages with the terminal unit corresponding to the temporary terminal ID, and assigning the terminal ID to the terminal unit corresponding to the temporary terminal ID, and wherein each of the terminal unit comprises:

temporary terminal ID generating means for randomly generating a temporary terminal ID that is an identifier for identifying the terminal unit that has not been assigned the terminal ID;

terminal ID assignment request message receiving means for receiving the terminal ID assignment request message through the predetermined control channel in the network when the terminal unit has not been assigned the terminal ID; and terminal ID assignment request acknowledgement message sending means for sending the terminal ID assignment request acknowledgement message that is an acknowledgment of the received terminal ID assignment request message and that has the temporary terminal ID generated by the terminal unit through the predetermined control channel in the network.

19. A center unit in a terminal ID assigning system for automatically assigning terminal IDs that are identifiers for uniquely identifying a plurality of terminal units in a network, at the initiative of the center unit, under the control of a communication system where the center unit and a plurality of the terminal units bidirectionally communication through the network having a "1" to "n" connecting function, comprising:

terminal ID assignment request message sending means for sending a terminal ID assignment request message for requesting an assignment of the terminal ID through a predetermined control channel in the network, before being requested from the terminal units;

terminal ID assignment request acknowledgement message receiving means for receiving a terminal ID assignment request acknowledgement message through the predetermined control channel in the network; and terminal ID assigning means for identifying a temporary terminal ID added to the received terminal ID assignment request acknowledgement message, exchanging messages with the terminal unit corresponding to the terminal ID, and assigning the terminal ID to the terminal unit corresponding to the temporary terminal ID.

20. A terminal unit in a terminal ID assigning system for automatically assigning terminal IDs that are identifiers for uniquely identifying a plurality of terminal units in a network, at the initiative of the center unit, under the control of a communication system where the center unit and a plurality of the terminal units bidirectionally communication through the network having a "1" to "n" connecting function, comprising:

temporary terminal ID generating means for randomly generating a temporary terminal ID that is an identifier for identifying the terminal unit when the terminal unit has not been assigned the terminal ID;

terminal ID assignment request message receiving means for receiving a terminal ID assignment request message through a predetermined control channel in the network when the terminal unit has not been assigned the terminal ID, before being requested from the terminal units; and terminal ID assignment request acknowledgement message sending means for sending a terminal ID assignment request acknowledgement message that is an acknowledgement of the received terminal ID assignment request message and that has the temporary terminal ID generated by the terminal unit through the predetermined control channel in the network.

* * * * *